US007255169B2

(12) United States Patent
van Batenburg et al.

(10) Patent No.: US 7,255,169 B2
(45) Date of Patent: *Aug. 14, 2007

(54) METHODS OF CREATING HIGH POROSITY PROPPED FRACTURES

(75) Inventors: Diederik van Batenburg, Delft (NL); Gerard Glasbergen, Gouda (NL)

(73) Assignee: Halliburton Energy Services, Inc., Duncan, OK (US)

( * ) Notice: Subject to any disclaimer, the term of this patent is extended or adjusted under 35 U.S.C. 154(b) by 249 days.

This patent is subject to a terminal disclaimer.

(21) Appl. No.: 11/049,252

(22) Filed: Feb. 2, 2005

(65) Prior Publication Data

US 2006/0048944 A1 Mar. 9, 2006

Related U.S. Application Data

(63) Continuation-in-part of application No. 10/937,076, filed on Sep. 9, 2004.

(51) Int. Cl.
*E21B 43/267* (2006.01)
(52) U.S. Cl. .................. 166/280.2; 166/281; 166/283; 507/924
(58) Field of Classification Search ............. 166/280.1, 166/280.2, 281, 283, 295, 308.2, 308.3; 428/403, 428/407; 507/924
See application file for complete search history.

(56) References Cited

U.S. PATENT DOCUMENTS

| 2,238,671 | A | 4/1941 | Woodhouse ................. 166/21 |
| 2,703,316 | A | 3/1955 | Schneider .................. 260/78.3 |
| 2,869,642 | A | 1/1959 | McKay et al. |
| 3,047,067 | A | 7/1962 | Williams et al. .............. 166/33 |
| 3,123,138 | A | 3/1964 | Robichaux |

(Continued)

FOREIGN PATENT DOCUMENTS

CA 2063877 5/2003

(Continued)

OTHER PUBLICATIONS

S. W. Almond, et al., "*Factors Affecting Proppant Flowback with Resin Coated Proppants*," Society of Petroleum Engineers, Inc., SPE 30096, p. 171-186, 1995.

(Continued)

*Primary Examiner*—George Suchfield
(74) *Attorney, Agent, or Firm*—Robert A. Kent; Baker Botts

(57) ABSTRACT

Methods of forming a high porosity propped fracture comprising: providing a slurry comprising a fracturing fluid, proppant particulates, and a weighting agent; introducing the slurry into a portion of a fracture within the subterranean formation; and, depositing the proppant particulates into the portion of the fracture within the subterranean formation so as to form a high porosity propped fracture. Methods of fracturing a subterranean formation to form a high porosity propped fracture comprising: creating at least one fracture within a portion of a subterranean formation; placing a slurry comprising a fracturing fluid, high density plastic particulates, and a weighting agent into at least a portion of the created fracture; and, depositing the high density plastic proppant particulates into a portion of the fracture so as to form a high porosity propped fracture. Slurries suitable for use in subterranean fracturing operations comprising: a fracturing fluid, proppant particulates, and a weighting agent.

20 Claims, 7 Drawing Sheets

U.S. PATENT DOCUMENTS

| | | | |
|---|---|---|---|
| 3,176,768 A | 4/1965 | Brandt et al. ................. 166/33 |
| 3,199,590 A | 8/1965 | Young | |
| 3,272,650 A | 9/1966 | MacVittie ...................... 134/7 |
| 3,297,086 A | 1/1967 | Spain | |
| 3,308,885 A | 3/1967 | Sandiford | |
| 3,316,965 A | 5/1967 | Watanabe .................... 166/33 |
| 3,336,980 A | 8/1967 | Rike .......................... 166/295 |
| 3,375,872 A | 4/1968 | McLaughlin et al. ......... 166/29 |
| 3,404,735 A | 10/1968 | Young et al. ................. 166/33 |
| 3,415,320 A | 12/1968 | Young ......................... 166/33 |
| 3,492,147 A | 1/1970 | Young et al. ............... 117/62.2 |
| 3,659,651 A | 5/1972 | Graham ....................... 166/280 |
| 3,681,287 A | 8/1972 | Brown et al. ................. 260/67 |
| 3,708,013 A | 1/1973 | Dismuke .................... 166/276 |
| 3,709,298 A | 1/1973 | Pramann .................... 166/276 |
| 3,754,598 A | 8/1973 | Holloway, Jr. .............. 166/249 |
| 3,765,804 A | 10/1973 | Brandon .................... 417/540 |
| 3,768,564 A | 10/1973 | Knox et al. ................. 166/307 |
| 3,784,585 A | 1/1974 | Schmitt et al. ............. 260/861 |
| 3,819,525 A | 6/1974 | Hattenbrun ................. 252/132 |
| 3,828,854 A | 8/1974 | Templeton et al. ......... 166/307 |
| 3,842,911 A | 10/1974 | Know et al. ................. 166/307 |
| 3,854,533 A | 12/1974 | Gurley et al. ............... 166/276 |
| 3,857,444 A | 12/1974 | Copeland .................... 166/276 |
| 3,863,709 A | 2/1975 | Fitch .............................. 165/1 |
| 3,868,998 A | 3/1975 | Lybarger et al. ............ 166/278 |
| 3,888,311 A | 6/1975 | Cooke, Jr. ................... 166/276 |
| 3,912,692 A | 10/1975 | Casey et al. ............... 260/78.3 |
| 3,948,672 A | 4/1976 | Hamberger .................. 106/90 |
| 3,955,993 A | 5/1976 | Curtice et al. ................ 106/90 |
| 3,960,736 A | 6/1976 | Free et al. ............. 252/8.55 R |
| 4,008,763 A | 2/1977 | Lowe, Jr. .................... 166/253 |
| 4,015,995 A | 4/1977 | Hess .......................... 106/287 |
| 4,029,148 A | 6/1977 | Emery ...................... 166/250.1 |
| 4,031,958 A | 6/1977 | Sandiford et al. .......... 166/270 |
| 4,042,032 A | 8/1977 | Anderson et al. ........... 166/276 |
| 4,070,865 A | 1/1978 | McLaughlin ................... 61/36 |
| 4,074,760 A | 2/1978 | Copeland et al. ........... 166/276 |
| 4,085,801 A | 4/1978 | Sifferman et al. .......... 166/295 |
| 4,127,173 A | 11/1978 | Watkins et al. ............. 166/276 |
| 4,169,798 A | 10/1979 | DeMartino ............. 252/8.55 R |
| 4,172,066 A | 10/1979 | Zweigle et al. ....... 260/29.6 TA |
| 4,245,702 A | 1/1981 | Haafkens et al. ........... 166/307 |
| 4,273,187 A | 6/1981 | Satter et al. ................. 166/250 |
| 4,291,766 A | 9/1981 | Davies et al. ............... 166/276 |
| 4,305,463 A | 12/1981 | Zakiewicz .................. 106/245 |
| 4,336,842 A | 6/1982 | Graham et al. ............. 166/276 |
| 4,352,674 A | 10/1982 | Fery ............................. 23/230 |
| 4,353,806 A | 10/1982 | Canter et al. ............... 507/229 |
| 4,387,769 A | 6/1983 | Erbstoesser et al. ........ 166/295 |
| 4,415,805 A | 11/1983 | Fertl et al. ................... 250/260 |
| 4,439,489 A | 3/1984 | Johnson et al. ............. 428/404 |
| 4,443,347 A | 4/1984 | Underdown et al. ... 252/8.55 R |
| 4,460,052 A | 7/1984 | Gockel ......................... 175/72 |
| 4,470,915 A | 9/1984 | Conway ................. 252/8.55 R |
| 4,493,875 A | 1/1985 | Beck et al. .................. 428/403 |
| 4,494,605 A | 1/1985 | Wiechel et al. ............. 166/288 |
| 4,498,995 A | 2/1985 | Gockel ..................... 252/8.5 LC |
| 4,501,328 A | 2/1985 | Nichols ....................... 166/288 |
| 4,526,695 A | 7/1985 | Erbstoesser et al. ... 252/8.55 R |
| 4,527,627 A | 7/1985 | Graham et al. ............. 166/280 |
| 4,541,489 A | 9/1985 | Wu .............................. 166/312 |
| 4,546,012 A | 10/1985 | Brooks ........................ 427/213 |
| 4,553,596 A | 11/1985 | Graham et al. ............. 166/295 |
| 4,564,459 A | 1/1986 | Underdown et al. ... 252/8.55 R |
| 4,572,803 A | 2/1986 | Yamazoe et al. ............ 534/16 |
| 4,649,998 A | 3/1987 | Friedman .................... 166/294 |
| 4,664,819 A | 5/1987 | Glaze et al. .............. 252/8.551 |
| 4,665,988 A | 5/1987 | Murphey et al. ............ 166/295 |
| 4,669,543 A | 6/1987 | Young ........................ 166/276 |
| 4,675,140 A | 6/1987 | Sparks et al. ................ 264/4.3 |
| 4,683,954 A | 8/1987 | Walker et al. ............... 166/307 |
| 4,694,905 A | 9/1987 | Armbruster ................. 166/280 |
| 4,715,967 A | 12/1987 | Bellis et al. .............. 252/8.551 |
| 4,716,964 A | 1/1988 | Erbstoesser et al. ........ 166/284 |
| 4,723,604 A * | 2/1988 | Emery ...................... 166/280.1 |
| 4,733,729 A | 3/1988 | Copeland .................... 166/276 |
| 4,739,832 A | 4/1988 | Jennings, Jr. et al. ....... 166/299 |
| 4,785,884 A | 11/1988 | Armbruster ................. 166/280 |
| 4,787,453 A | 11/1988 | Hewgill et al. ........... 166/272.3 |
| 4,789,105 A | 12/1988 | Hosokawa et al. ........... 241/67 |
| 4,796,701 A | 1/1989 | Hudson et al. ............. 166/278 |
| 4,797,262 A | 1/1989 | Dewitz ....................... 422/142 |
| 4,800,960 A | 1/1989 | Friedman et al. ........... 166/276 |
| 4,809,783 A | 3/1989 | Hollenbeck et al. ........ 166/307 |
| 4,817,721 A | 4/1989 | Pober .......................... 166/295 |
| 4,829,100 A | 5/1989 | Murphey et al. ............ 523/131 |
| 4,838,352 A | 6/1989 | Oberste-Padtberg et al. ............................ 166/291 |
| 4,842,072 A | 6/1989 | Friedman et al. ........... 166/295 |
| 4,843,118 A | 6/1989 | Lai et al. .................... 524/555 |
| 4,848,467 A | 7/1989 | Cantu et al. ................ 166/281 |
| 4,848,470 A | 7/1989 | Korpics ...................... 166/312 |
| 4,850,430 A | 7/1989 | Copeland et al. ........... 166/276 |
| 4,875,525 A | 10/1989 | Mana .......................... 166/280 |
| 4,886,354 A | 12/1989 | Welch et al. .................. 356/70 |
| 4,888,240 A | 12/1989 | Graham et al. ............. 428/403 |
| 4,895,207 A | 1/1990 | Friedman et al. ........... 166/276 |
| 4,903,770 A | 2/1990 | Friedman et al. ........... 166/288 |
| 4,934,456 A | 6/1990 | Moradi-Araghi ............ 166/270 |
| 4,936,385 A | 6/1990 | Weaver et al. .............. 166/288 |
| 4,942,186 A | 7/1990 | Murphey et al. ............ 523/131 |
| 4,957,165 A | 9/1990 | Cantu et al. ................ 166/295 |
| 4,959,432 A | 9/1990 | Fan et al. .................... 526/287 |
| 4,961,466 A | 10/1990 | Himes et al. ................ 166/250 |
| 4,969,522 A | 11/1990 | Whitehurst et al. ......... 166/278 |
| 4,969,523 A | 11/1990 | Martin et al. ............... 166/278 |
| 4,986,353 A | 1/1991 | Clark et al. ................. 166/279 |
| 4,986,354 A | 1/1991 | Cantu et al. ................ 166/279 |
| 4,986,355 A | 1/1991 | Casad et al. ................ 166/295 |
| 5,030,603 A | 7/1991 | Rumpf et al. ............... 501/127 |
| 5,049,743 A | 9/1991 | Taylor, III et al. .......... 250/303 |
| 5,082,056 A | 1/1992 | Tackett, Jr. .................. 166/295 |
| 5,105,886 A | 4/1992 | Strubhar et al. ............ 166/280 |
| 5,107,928 A | 4/1992 | Hilterhaus .................. 166/293 |
| 5,128,390 A | 7/1992 | Murphey et al. ............ 523/130 |
| 5,135,051 A | 8/1992 | Fracteau et al. ............. 166/104 |
| 5,142,023 A | 8/1992 | Gruber et al. ............... 528/354 |
| 5,165,438 A | 11/1992 | Fracteau et al. ............... 137/1 |
| 5,173,527 A | 12/1992 | Calve .......................... 524/74 |
| 5,178,218 A | 1/1993 | Dees ........................... 166/281 |
| 5,182,051 A | 1/1993 | Bandy et al. ................ 252/645 |
| 5,199,491 A | 4/1993 | Kutts et al. ................. 166/276 |
| 5,199,492 A | 4/1993 | Surles et al. ................ 166/295 |
| 5,211,234 A | 5/1993 | Floyd ......................... 166/276 |
| 5,216,050 A | 6/1993 | Sinclair ...................... 524/108 |
| 5,218,038 A | 6/1993 | Johnson et al. ............. 524/541 |
| 5,232,955 A | 8/1993 | Caabai et al. ................ 521/63 |
| 5,232,961 A | 8/1993 | Murphey et al. ............ 523/414 |
| 5,238,068 A | 8/1993 | Fredickson ................. 166/307 |
| 5,247,059 A | 9/1993 | Gruber et al. ............... 528/354 |
| 5,249,628 A | 10/1993 | Surjaatmadja .............. 166/305 |
| 5,256,729 A | 10/1993 | Kutts et al. ................. 524/700 |
| 5,273,115 A | 12/1993 | Spafford ..................... 166/281 |
| 5,285,849 A | 2/1994 | Surles et al. ................ 166/295 |
| 5,293,939 A | 3/1994 | Surles et al. ................ 166/295 |
| 5,295,542 A | 3/1994 | Cole et al. .................. 166/278 |
| 5,320,171 A | 6/1994 | Laramay .................... 166/285 |
| 5,321,062 A | 6/1994 | Landrum et al. ............ 523/141 |
| 5,325,923 A | 7/1994 | Surjaatmadja et al. ...... 166/308 |
| 5,330,005 A | 7/1994 | Card et al. .................. 166/280 |
| 5,332,037 A | 7/1994 | Schmidt et al. ............. 166/276 |
| 5,335,726 A | 8/1994 | Rodrogues .................. 166/295 |
| 5,351,754 A | 10/1994 | Hardin et al. ............... 166/249 |

| Patent | Date | Inventor | Class |
|---|---|---|---|
| 5,358,051 A | 10/1994 | Rodrigues | 166/295 |
| 5,359,026 A | 10/1994 | Gruber | 528/354 |
| 5,360,068 A | 11/1994 | Sprunt et al. | 166/259 |
| 5,361,856 A | 11/1994 | Surjaatmadja et al. | 175/67 |
| 5,363,916 A | 11/1994 | Himes et al. | 166/276 |
| 5,373,901 A | 12/1994 | Norman et al. | 166/300 |
| 5,377,759 A | 1/1995 | Surles | 166/295 |
| 5,381,864 A | 1/1995 | Nguyen et al. | 166/280 |
| 5,386,874 A | 2/1995 | Laramay et al. | 166/300 |
| 5,388,648 A | 2/1995 | Jordan, Jr. | 166/380 |
| 5,393,810 A | 2/1995 | Harris et al. | 524/56 |
| 5,396,957 A | 3/1995 | Surjaatmadja et al. | 166/308 |
| 5,402,846 A | 4/1995 | Jennings, Jr. et al. | 166/259 |
| 5,422,183 A | 6/1995 | Sinclair et al. | 428/403 |
| 5,423,381 A | 6/1995 | Suries et al. | 166/295 |
| 5,439,055 A | 8/1995 | Card et al. | 166/280 |
| 5,460,226 A | 10/1995 | Lawton et al. | 166/300 |
| 5,464,060 A | 11/1995 | Hale et al. | 166/293 |
| 5,475,080 A | 12/1995 | Gruber et al. | 528/354 |
| 5,484,881 A | 1/1996 | Gruber et al. | 528/54 |
| 5,492,178 A | 2/1996 | Nguyen et al. | 166/276 |
| 5,494,103 A | 2/1996 | Surjaatmadja et al. | 166/222 |
| 5,497,830 A | 3/1996 | Boles et al. | 166/300 |
| 5,498,280 A | 3/1996 | Fistner et al. | 106/19 |
| 5,499,678 A | 3/1996 | Surjaatmadja et al. | 166/298 |
| 5,501,275 A | 3/1996 | Card et al. | 166/280 |
| 5,505,787 A | 4/1996 | Yamaguchi | 134/4 |
| 5,512,071 A | 4/1996 | Yam et al. | 51/307 |
| 5,520,250 A | 5/1996 | Harry et al. | 166/278 |
| 5,522,460 A | 6/1996 | Shu | 166/295 |
| 5,529,123 A | 6/1996 | Carpenter et al. | 166/293 |
| 5,531,274 A | 7/1996 | Bienvenu, Jr. | 166/280 |
| 5,536,807 A | 7/1996 | Gruber et al. | 528/354 |
| 5,545,824 A | 8/1996 | Stengel et al. | 524/590 |
| 5,547,023 A | 8/1996 | McDaniel et al. | 166/280 |
| 5,551,513 A | 9/1996 | Suries et al. | 166/278 |
| 5,551,514 A | 9/1996 | Nelson et al. | 166/280 |
| 5,582,249 A | 12/1996 | Caveny et al. | 166/276 |
| 5,582,250 A | 12/1996 | Constein | 166/280 |
| 5,588,488 A | 12/1996 | Vijn et al. | 166/293 |
| 5,591,700 A | 1/1997 | Harris et al. | 507/204 |
| 5,594,095 A | 1/1997 | Gruber et al. | 528/354 |
| 5,595,245 A | 1/1997 | Scott, III | 166/250.1 |
| 5,597,784 A | 1/1997 | Sinclair et al. | 507/219 |
| 5,604,184 A | 2/1997 | Ellis et al. | 507/117 |
| 5,604,186 A | 2/1997 | Hunt et al. | 507/204 |
| 5,609,207 A | 3/1997 | Dewprashad et al. | 166/276 |
| 5,620,049 A | 4/1997 | Gipson et al. | 166/248 |
| 5,639,806 A | 6/1997 | Johnson et al. | 523/208 |
| 5,670,473 A | 9/1997 | Scepanski | 510/445 |
| 5,692,566 A | 12/1997 | Surles | 166/295 |
| 5,697,440 A | 12/1997 | Weaver et al. | 166/281 |
| 5,698,322 A | 12/1997 | Tsai et al. | 428/373 |
| 5,712,314 A | 1/1998 | Surles et al. | 521/41 |
| 5,732,364 A | 3/1998 | Kalb et al. | 588/8 |
| 5,765,642 A | 6/1998 | Surjaatmadja | 166/297 |
| 5,775,425 A | 7/1998 | Weaver et al. | 166/276 |
| 5,782,300 A | 7/1998 | James et al. | 166/276 |
| 5,783,822 A | 7/1998 | Buchanan et al. | 250/259 |
| 5,787,986 A | 8/1998 | Weaver et al. | 166/280 |
| 5,791,415 A | 8/1998 | Nguyen et al. | 166/280 |
| 5,799,734 A | 9/1998 | Norman et al. | 166/278 |
| 5,806,593 A | 9/1998 | Suries | 166/270 |
| 5,830,987 A | 11/1998 | Smith | 528/332 |
| 5,833,000 A | 11/1998 | Weaver et al. | 166/276 |
| 5,833,361 A | 11/1998 | Funk | 366/80 |
| 5,836,391 A | 11/1998 | Jonasson et al. | 166/295 |
| 5,836,392 A | 11/1998 | Urlwin-Smith | 166/295 |
| 5,837,656 A | 11/1998 | Sinclair et al. | 507/220 |
| 5,837,785 A | 11/1998 | Kinsho et al. | 525/527 |
| 5,839,510 A | 11/1998 | Weaver et al. | 166/276 |
| 5,840,784 A | 11/1998 | Funkhouser et al. | 523/130 |
| 5,849,401 A | 12/1998 | El-Afandi et al. | 428/215 |
| 5,849,590 A | 12/1998 | Anderson, II et al. | 436/27 |
| 5,853,048 A | 12/1998 | Weaver et al. | 166/279 |
| 5,864,003 A | 1/1999 | Qureshi et al. | 528/141 |
| 5,865,936 A | 2/1999 | Edelman et al. | 156/310 |
| 5,871,049 A | 2/1999 | Weaver et al. | 166/276 |
| 5,873,413 A | 2/1999 | Chatterji et al. | 166/293 |
| 5,875,844 A | 3/1999 | Chatterji et al. | 166/293 |
| 5,875,845 A | 3/1999 | Chatterji et al. | 166/293 |
| 5,875,846 A | 3/1999 | Chatterji et al. | 166/293 |
| 5,893,383 A | 4/1999 | Fracteau | 137/14 |
| 5,893,416 A | 4/1999 | Read | 166/304 |
| 5,908,073 A | 6/1999 | Nguyen et al. | 166/276 |
| 5,911,282 A | 6/1999 | Onan et al. | 175/72 |
| 5,916,933 A | 6/1999 | Johnson et al. | 523/208 |
| 5,921,317 A | 7/1999 | Dewprashad et al. | 166/208 |
| 5,924,488 A | 7/1999 | Nguyen et al. | 166/280 |
| 5,929,437 A | 7/1999 | Elliott et al. | 250/259 |
| 5,944,105 A | 8/1999 | Nguyen | 166/278 |
| 5,945,387 A | 8/1999 | Chatterji et al. | 507/224 |
| 5,948,734 A | 9/1999 | Sinclair et al. | 507/219 |
| 5,957,204 A | 9/1999 | Chatterji et al. | 166/295 |
| 5,960,877 A | 10/1999 | Funkhouser et al. | 166/270 |
| 5,960,880 A | 10/1999 | Nguyen et al. | 166/280 |
| 5,964,291 A | 10/1999 | Bourne et al. | 166/279 |
| 5,969,006 A | 10/1999 | Onan et al. | 523/166 |
| 5,977,283 A | 11/1999 | Rossitto | 528/44 |
| 5,994,785 A | 11/1999 | Higuchi et al. | 527/789 |
| RE36,466 E | 12/1999 | Nelson et al. | 166/280 |
| 6,003,600 A | 12/1999 | Nguyen et al. | 166/281 |
| 6,004,400 A | 12/1999 | Bishop et al. | 134/2 |
| 6,006,835 A | 12/1999 | Onan et al. | 166/295 |
| 6,006,836 A | 12/1999 | Chatterji et al. | 166/295 |
| 6,012,524 A | 1/2000 | Chatterji et al. | 166/295 |
| 6,016,870 A | 1/2000 | Dewprashad et al. | 166/295 |
| 6,024,170 A | 2/2000 | McCabe et al. | 166/300 |
| 6,028,113 A | 2/2000 | Scepanski | 514/643 |
| 6,028,534 A | 2/2000 | Ciglenec et al. | 340/856.2 |
| 6,040,398 A | 3/2000 | Kinsho et al. | 525/527 |
| 6,047,772 A | 4/2000 | Weaver et al. | 166/276 |
| 6,059,034 A * | 5/2000 | Rickards et al. | 166/280.2 |
| 6,059,035 A | 5/2000 | Chatterji et al. | 166/293 |
| 6,059,036 A | 5/2000 | Chatterji et al. | 166/294 |
| 6,068,055 A | 5/2000 | Chatterji et al. | 166/293 |
| 6,069,117 A | 5/2000 | Onan et al. | 507/202 |
| 6,074,739 A | 6/2000 | Katagiri | 428/323 |
| 6,079,492 A | 6/2000 | Hoogteijling et al. | 166/276 |
| 6,098,711 A | 8/2000 | Chatterji et al. | 166/294 |
| 6,114,410 A | 9/2000 | Betzold | 523/130 |
| 6,123,871 A | 9/2000 | Carroll | 252/301.36 |
| 6,123,965 A | 9/2000 | Jacon et al. | 424/489 |
| 6,124,246 A | 9/2000 | Heathman et al. | 507/219 |
| 6,130,286 A | 10/2000 | Thomas et al. | 524/507 |
| 6,135,987 A | 10/2000 | Tsai et al. | 604/365 |
| 6,140,446 A | 10/2000 | Fujiki et al. | 528/15 |
| 6,148,911 A | 11/2000 | Gipson et al. | 166/248 |
| 6,152,234 A | 11/2000 | Newhouse et al. | 166/403 |
| 6,162,766 A | 12/2000 | Muir et al. | 507/267 |
| 6,169,058 B1 | 1/2001 | Le et al. | 507/222 |
| 6,172,011 B1 | 1/2001 | Card et al. | 507/204 |
| 6,172,077 B1 | 1/2001 | Curtis et al. | 514/278 |
| 6,176,315 B1 | 1/2001 | Reddy et al. | 166/295 |
| 6,177,484 B1 | 1/2001 | Surles | 523/131 |
| 6,184,311 B1 | 2/2001 | O'Keefe et al. | 525/438 |
| 6,187,834 B1 | 2/2001 | Thayer et al. | 522/15 |
| 6,187,839 B1 | 2/2001 | Eoff et al. | 523/130 |
| 6,189,615 B1 | 2/2001 | Sydansk | 166/270 |
| 6,192,985 B1 | 2/2001 | Hinkel et al. | 166/280 |
| 6,192,986 B1 | 2/2001 | Urlwin-Smith | 166/295 |
| 6,196,317 B1 | 3/2001 | Hardy | 166/295 |
| 6,202,751 B1 | 3/2001 | Chatterji et al. | 166/276 |
| 6,209,643 B1 | 4/2001 | Nguyen et al. | 166/276 |
| 6,209,644 B1 | 4/2001 | Brunet | 166/297 |
| 6,209,646 B1 | 4/2001 | Reddy et al. | 166/300 |

| Patent | Date | Inventor | Class |
|---|---|---|---|
| 6,210,471 B1 | 4/2001 | Craig | 106/31.08 |
| 6,214,773 B1 | 4/2001 | Harris et al. | 507/271 |
| 6,231,664 B1 | 5/2001 | Chatterji et al. | 106/724 |
| 6,234,251 B1 | 5/2001 | Chatterji et al. | 166/295 |
| 6,238,597 B1 | 5/2001 | Yim et al. | 252/512 |
| 6,241,019 B1 | 6/2001 | Davidson et al. | 166/249 |
| 6,242,390 B1 | 6/2001 | Mitchell et al. | 507/211 |
| 6,244,344 B1 | 6/2001 | Chatterji et al. | 166/295 |
| 6,257,335 B1 | 7/2001 | Nguyen et al. | 166/280 |
| 6,260,622 B1 | 7/2001 | Blok et al. | 166/305.1 |
| 6,271,181 B1 | 8/2001 | Chatterji et al. | 507/219 |
| 6,274,650 B1 | 8/2001 | Cui | 523/457 |
| 6,279,652 B1 | 8/2001 | Chatterji et al. | 166/194 |
| 6,279,656 B1 | 8/2001 | Sinclair et al. | 166/310 |
| 6,283,214 B1 | 9/2001 | Guinot et al. | 166/297 |
| 6,302,207 B1 | 10/2001 | Nguyen et al. | 166/276 |
| 6,306,998 B1 | 10/2001 | Kimura et al. | 528/12 |
| 6,311,773 B1 | 11/2001 | Todd et al. | 166/280 |
| 6,321,841 B1 | 11/2001 | Eoff et al. | 166/291 |
| 6,323,307 B1 | 11/2001 | Bigg et al. | 528/354 |
| 6,326,458 B1 | 12/2001 | Gruber et al. | 528/354 |
| 6,328,105 B1 | 12/2001 | Betzold | 166/280 |
| 6,328,106 B1 | 12/2001 | Griffith et al. | 166/295 |
| 6,330,916 B1 | 12/2001 | Rickards et al. | 166/280 |
| 6,330,917 B2 | 12/2001 | Chatterji et al. | 166/295 |
| 6,350,309 B2 | 2/2002 | Chatterji et al. | 106/677 |
| 6,357,527 B1 | 3/2002 | Norman et al. | 166/300 |
| 6,364,018 B1 | 4/2002 | Brannon et al. | 166/280.2 |
| 6,364,945 B1 | 4/2002 | Chatterji et al. | 106/677 |
| 6,367,165 B1 | 4/2002 | Huttlin | 34/582 |
| 6,367,549 B1 | 4/2002 | Chatterji et al. | 166/292 |
| 6,372,678 B1 | 4/2002 | Youngsman et al. | 504/128 |
| 6,376,571 B1 | 4/2002 | Chawla et al. | 522/64 |
| 6,387,986 B1 | 5/2002 | Moradi-Araghi et al. | 523/211 |
| 6,390,195 B1 | 5/2002 | Nguyen et al. | 166/276 |
| 6,401,817 B1 | 6/2002 | Griffith et al. | 166/295 |
| 6,405,797 B2 | 6/2002 | Davidson et al. | 166/249 |
| 6,406,789 B1 | 6/2002 | McDaniel et al. | 428/403 |
| 6,408,943 B1 | 6/2002 | Schultz et al. | 166/285 |
| 6,422,314 B1 | 7/2002 | Todd et al. | 166/312 |
| 6,439,309 B1 | 8/2002 | Matherly et al. | 166/276 |
| 6,439,310 B1 | 8/2002 | Scott, III et al. | 166/308 |
| 6,440,255 B1 | 8/2002 | Kohlhammer et al. | 156/283 |
| 6,446,727 B1 | 9/2002 | Zemlak et al. | 166/308 |
| 6,448,206 B1 | 9/2002 | Griffith et al. | 507/219 |
| 6,450,260 B1 | 9/2002 | James et al. | 166/277 |
| 6,454,003 B1 | 9/2002 | Chang et al. | 166/270 |
| 6,458,885 B1 | 10/2002 | Stengel et al. | 524/507 |
| 6,485,947 B1 | 11/2002 | Rajgarhia et al. | 435/139 |
| 6,488,091 B1 | 12/2002 | Weaver et al. | 166/300 |
| 6,488,763 B2 | 12/2002 | Brothers et al. | 106/692 |
| 6,494,263 B2 | 12/2002 | Todd | 166/312 |
| 6,503,870 B2 | 1/2003 | Griffith et al. | 507/219 |
| 6,508,305 B1 | 1/2003 | Brannon et al. | 166/293 |
| 6,527,051 B1 | 3/2003 | Reddy et al. | 166/300 |
| 6,528,157 B1 | 3/2003 | Hussain et al. | 428/325 |
| 6,531,427 B1 | 3/2003 | Shuchart et al. | 507/267 |
| 6,538,576 B1 | 3/2003 | Schultz et al. | 340/859.6 |
| 6,543,545 B1 | 4/2003 | Chatterji et al. | 166/381 |
| 6,552,333 B1 | 4/2003 | Storm et al. | 250/269.3 |
| 6,554,071 B1 | 4/2003 | Reddy et al. | 166/293 |
| 6,555,507 B2 | 4/2003 | Chatterji et al. | 507/219 |
| 6,569,814 B1 | 5/2003 | Brady et al. | 507/201 |
| 6,582,819 B2 | 6/2003 | McDaniel et al. | 428/402 |
| 6,593,402 B2 | 7/2003 | Chatterji et al. | 524/7 |
| 6,599,863 B1 | 7/2003 | Palmer et al. | 507/219 |
| 6,608,162 B1 | 8/2003 | Chiu et al. | 528/129 |
| 6,616,320 B2 | 9/2003 | Huber et al. | 366/156.2 |
| 6,620,857 B2 | 9/2003 | Valet | 522/42 |
| 6,626,241 B2 | 9/2003 | Nguyen | 166/278 |
| 6,632,527 B1 | 10/2003 | McDaniel et al. | 428/402 |
| 6,632,892 B2 | 10/2003 | Rubinsztajn et al. | 525/476 |
| 6,642,309 B2 | 11/2003 | Komitsu et al. | 525/100 |
| 6,648,501 B2 | 11/2003 | Huber et al. | 366/301 |
| 6,659,179 B2 | 12/2003 | Nguyen | 166/227 |
| 6,664,343 B2 | 12/2003 | Narisawa et al. | 525/474 |
| 6,667,279 B1 | 12/2003 | Hessert et al. | 507/225 |
| 6,668,926 B2 | 12/2003 | Nguyen et al. | 166/280 |
| 6,669,771 B2 | 12/2003 | Tokiwa et al. | 106/162.7 |
| 6,681,856 B1 | 1/2004 | Chatterji et al. | 166/294 |
| 6,686,328 B1 | 2/2004 | Binder | 510/446 |
| 6,705,400 B1 | 3/2004 | Nugyen et al. | 166/281 |
| 6,710,019 B1 | 3/2004 | Sawdon et al. | 507/136 |
| 6,713,170 B1 | 3/2004 | Kaneka et al. | 428/323 |
| 6,725,926 B2 | 4/2004 | Nguyen et al. | 166/254.1 |
| 6,725,930 B2 * | 4/2004 | Boney et al. | 166/280.2 |
| 6,725,931 B2 | 4/2004 | Nguyen et al. | 166/280.2 |
| 6,729,404 B2 | 5/2004 | Nguyen et al. | 166/280.2 |
| 6,732,800 B2 | 5/2004 | Acock et al. | 166/308 |
| 6,745,159 B1 | 6/2004 | Todd et al. | 703/10 |
| 6,749,025 B1 | 6/2004 | Brannon et al. | 166/305.1 |
| 6,763,888 B1 | 7/2004 | Harris et al. | 166/305.1 |
| 6,766,858 B2 | 7/2004 | Nguyen et al. | 166/300 |
| 6,776,236 B1 | 8/2004 | Nguyen | 166/279 |
| 6,832,650 B2 | 12/2004 | Nguyen et al. | 166/279 |
| 6,851,474 B2 | 2/2005 | Nguyen | 166/279 |
| 6,887,834 B2 | 5/2005 | Nguyen et al. | 507/221 |
| 6,978,836 B2 | 12/2005 | Nguyen et al. | 166/295 |
| 2001/0016562 A1 | 8/2001 | Muir et al. | 507/201 |
| 2002/0043370 A1 | 4/2002 | Poe | 166/250.07 |
| 2002/0048676 A1 | 4/2002 | McDaniel et al. | 428/404 |
| 2002/0070020 A1 | 6/2002 | Nguyen | 166/295 |
| 2003/0006036 A1 | 1/2003 | Malone et al. | 166/250.12 |
| 2003/0060374 A1 | 3/2003 | Cooke, Jr. | 507/200 |
| 2003/0106690 A1 | 6/2003 | Boney et al. | 166/280 |
| 2003/0114314 A1 | 6/2003 | Ballard et al. | 507/100 |
| 2003/0130133 A1 | 7/2003 | Vollmer | 507/100 |
| 2003/0131999 A1 | 7/2003 | Nguyen et al. | 166/280 |
| 2003/0148893 A1 | 8/2003 | Lungofer et al. | 507/200 |
| 2003/0186820 A1 | 10/2003 | Thesing | 507/200 |
| 2003/0188766 A1 | 10/2003 | Banerjee et al. | 134/7 |
| 2003/0188872 A1 | 10/2003 | Nguyen et al. | 166/308 |
| 2003/0196805 A1 | 10/2003 | Boney et al. | 166/280 |
| 2003/0205376 A1 | 11/2003 | Ayoub et al. | 166/254.2 |
| 2003/0230408 A1 | 12/2003 | Acock et al. | 166/297 |
| 2003/0234103 A1 | 12/2003 | Lee et al. | 166/293 |
| 2004/0000402 A1 | 1/2004 | Nguyen et al. | 166/280 |
| 2004/0014607 A1 | 1/2004 | Sinclair et al. | 507/200 |
| 2004/0014608 A1 | 1/2004 | Nguyen et al. | 507/200 |
| 2004/0040706 A1 | 3/2004 | Hossaini et al. | 166/278 |
| 2004/0040708 A1 | 3/2004 | Stephenson et al. | 166/280.1 |
| 2004/0040713 A1 | 3/2004 | Nguyen et al. | 166/295 |
| 2004/0048752 A1 | 3/2004 | Nguyen et al. | 507/269 |
| 2004/0055747 A1 | 3/2004 | Lee | 166/278 |
| 2004/0106525 A1 | 6/2004 | Willbert et al. | 507/200 |
| 2004/0138068 A1 | 7/2004 | Rimmer et al. | 507/100 |
| 2004/0149441 A1 | 8/2004 | Nguyen et al. | 166/280.1 |
| 2004/0152601 A1 | 8/2004 | Still et al. | 507/100 |
| 2004/0177961 A1 | 9/2004 | Nguyen et al. | 166/280.2 |
| 2004/0194961 A1 | 10/2004 | Nguyen et al. | 166/295 |
| 2004/0206499 A1 | 10/2004 | Nguyen et al. | 166/280.2 |
| 2004/0211559 A1 | 10/2004 | Nguyen et al. | 166/276 |
| 2004/0211561 A1 | 10/2004 | Nguyen et al. | 166/280.2 |
| 2004/0221992 A1 | 11/2004 | Nguyen et al. | 166/295 |
| 2004/0231845 A1 | 11/2004 | Cooke, Jr. | 166/279 |
| 2004/0231847 A1 | 11/2004 | Nguyen et al. | 166/295 |
| 2004/0256099 A1 | 12/2004 | Nguyen et al. | 166/249 |
| 2004/0261995 A1 | 12/2004 | Nguyen et al. | 166/279 |
| 2004/0261997 A1 | 12/2004 | Nguyen et al. | 166/281 |
| 2005/0000731 A1 | 1/2005 | Nguyen et al. | 175/57 |
| 2005/0006093 A1 | 1/2005 | Nguyen et al. | 166/281 |
| 2005/0006095 A1 | 1/2005 | Justus et al. | 166/295 |
| 2005/0006096 A1 | 1/2005 | Nguyen et al. | 166/295 |
| 2005/0034862 A1 | 2/2005 | Nguyen et al. | 166/281 |

| | | | |
|---|---|---|---|
| 2005/0045326 A1 | 3/2005 | Nguyen | 166/278 |

FOREIGN PATENT DOCUMENTS

| | | | |
|---|---|---|---|
| EP | 0313243 B1 | 10/1988 | |
| EP | 0528595 A1 | 8/1992 | |
| EP | 0510762 A2 | 11/1992 | |
| EP | 0643196 A2 | 6/1994 | |
| EP | 0834644 A2 | 4/1998 | |
| EP | 0853186 A2 | 7/1998 | |
| EP | 0864726 A2 | 9/1998 | |
| EP | 0879935 B1 | 11/1998 | |
| EP | 0933498 A1 | 8/1999 | |
| EP | 1001133 A1 | 5/2000 | |
| EP | 1132569 A2 | 9/2001 | |
| EP | 1326003 A1 | 7/2003 | |
| EP | 1362978 A1 | 11/2003 | |
| EP | 1394355 A1 | 3/2004 | |
| EP | 1396606 A2 | 3/2004 | |
| EP | 1398640 A1 | 3/2004 | |
| EP | 1403466 A2 | 3/2004 | |
| EP | 1464789 A1 | 10/2004 | |
| GB | 1107584 | 3/1968 | |
| GB | 1264180 | 12/1969 | |
| GB | 1292718 | 10/1972 | |
| GB | 2382143 A | 4/2001 | |
| WO | WO93/15127 | 8/1993 | |
| WO | WO94/07949 | 4/1994 | |
| WO | WO94/08078 | 4/1994 | |
| WO | WO94/08090 | 4/1994 | |
| WO | WO95/09879 | 4/1995 | |
| WO | WO97/11845 | 4/1997 | |
| WO | WO99/27229 | 6/1999 | |
| WO | WO 01/81914 | 11/2001 | |
| WO | WO 01/87797 A1 | 11/2001 | |
| WO | WO 02/12674 A1 | 2/2002 | |
| WO | WO 03/027431 A1 | 4/2003 | |
| WO | WO 04/037946 A1 | 5/2004 | |
| WO | WO 04/038176 A1 | 5/2004 | |
| WO | WO 05/021928 A2 | 3/2005 | |

OTHER PUBLICATIONS

U.S. Appl. No. 10/383,154, filed Mar. 6, 2003, Nguyen et al.
U.S. Appl. No. 10/394,898, filed Mar. 21, 2003, Eoff et al.
U.S. Appl. No. 10/408,800, filed Apr. 7, 2003, Nguyen et al.
U.S. Appl. No. 10/601,407, filed Jun. 23, 2003, Byrd et al.
U.S. Appl. No. 10/603,492, filed Jun. 25, 2003, Nguyen et al.
U.S. Appl. No. 10/649,029, filed Aug. 27, 2003, Nguyen et al.
U.S. Appl. No. 10/650,063, filed Aug. 26, 2003, Nguyen.
U.S. Appl. No. 10/650,064, filed Aug. 26, 2003, Nguyen et al.
U.S. Appl. No. 10/650,065, filed Aug. 26, 2003, Nguyen.
U.S. Appl. No. 10/659,574, filed Sep. 10, 2003, Nguyen et al.
U.S. Appl. No. 10/727,365, filed Dec. 4, 2003, Reddy et al.
U.S. Appl. No. 10/751,593, filed Jan. 5, 2004, Nguyen.
U.S. Appl. No. 10/775,347, filed Feb. 10, 2004, Nguyen.
U.S. Appl. No. 10/791,944, filed Mar. 3, 2004, Nguyen.
U.S. Appl. No. 10/793,711, filed Mar. 5, 2004, Nguyen et al.
U.S. Appl. No. 10/852,811, filed May 25, 2004, Nguyen.
U.S. Appl. No. 10/860,951, filed Jun. 4, 2004, Stegent et al.
U.S. Appl. No. 10/861,829, filed Jun. 4, 2004, Stegent, et al.
U.S. Appl. No. 10/862,986, filed Jun. 8, 2004, Nguyen et al.
U.S. Appl. No. 10/868,593, filed Jun. 15, 2004, Nguyen et al.
U.S. Appl. No. 10/868,608, filed Jun. 15, 2004, Nguyen et al.
U.S. Appl. No. 10/937,076, filed Sep. 9, 2004, Nguyen et al.
U.S. Appl. No. 10/944,973, filed Sep. 20, 2004, Nguyen et al.
U.S. Appl. No. 10/972,648, filed Oct. 25, 2004, Dusterhoft et al.
U.S. Appl. No. 10/977,673, filed Oct. 29, 2004, Nguyen et al.
U.S. Appl. No. 11/009,277, filed Dec. 8, 2004, Welton et al.
U.S. Appl. No. 11/011,394, filed Dec. 12, 2004, Nguyen et al.
U.S. Appl. No. 11/035,833, filed Jan. 14, 2005, Nguyen.
U.S. Appl. No. 11/049,252, filed Feb. 2, 2005, Van Batenburg et al.
U.S. Appl. No. 11/053,280, filed Feb. 8, 2005, Nguyen.
U.S. Appl. No. 11/056,635, filed Feb. 11, 2005, Dusterhoft et al.

Halliburton, *CoalStim$^{SM}$ Service, Helps Boost Cash Flow From CBM Assets*, Stimulation, HO3679 Oct. 3, 2003, Halliburton Communications.
Halliburton, *Conductivity Endurance Technology For High Permeability Reservoirs, Helps Prevent Intrusion of Formation Material Into the Proppant Pack for Improved Long-term Production*, Stimulation, 2003, Halliburton Communications.
Halliburton, *Expedite® Service, A Step-Change Improvement Over Conventional Proppant Flowback Control Systems. Provides Up to Three Times the Conductivity of RCPs.*, Stimulation, HO3296 May 4, 2004, Halliburton Communications.
Halliburton Technical Flier—Multi Stage Frac Completion Methods, 2 pages.
Halliburton "*CobraFrac$^{SM}$ Service, Coiled Tubing Fracturing—Cost-Effective Method for Stimulating Untapped Reserves*", 2 pages, 2004.
Halliburton "*CobraJetFrac$^{SM}$ Service, Cost-Effective Technology That Can Help Reduce Cost per BOE Produced, Shorten Cycle time and Reduce Capex*".
Halliburton Cobra Frac Advertisement, 2001.
Halliburton "*SurgicFrac$^{SM}$ Service, a Quick and cost-Effective Method to Help Boost Production From Openhole Horizontal Completions*", 2002.
Halliburton, *SandWedge® NT Conductivity Enhancement System, Enhances Proppant Pack Conductivity and Helps Prevent Intrusion of Formation Material for Improved Long-Term Production*, Stimulation, HO2289 May 4, 2004, Halliburton Communications.
Nguyen et al. *A Novel Approach For Enhancing Proppant Consolidation: Laboratory Testing And Field Applications*, SPE Paper Number 77748, 2002.
SPE 15547, *Field Application of Lignosulfonate Gels To Reduce Channeling*, South Swan Hills Miscible Unit, Alberta, Canada, by O.R. Wagner et al., 1986.
Owens et al., *Waterflow Pressure Pulsing for Fractured Reservoirs* SPE 1123, 1966.
Felsenthal et al., *Pressure Pulsing—An Improved Method of Waterflooding Fractured Reservoirs* SPE 1788, 1957.
Raza, "*Water and Gas Cyclic Pulsing Method for Improved Oil Recovery*", SPE 3005, 1971.
Peng et al., "*Pressure Pulsing Waterflooding in Dual Porosity Naturally Fractured Reservoirs*" SPE 17587, 1988.
Dusseault et al, "*Pressure Pulse Workovers in Heavy Oil*", SPE 79033, 2002.
Yang et al., "*Experimental Study on Fracture Initiation By Pressure Pulse*", SPE 63035, 2000.
Nguyen et al., *New Guidelines For Applying Curable Resin-Coated Proppants*, SPE Paper No. 39582, 1997.
Kazakov et al., "*Optimizing and Managing Coiled Tubing Frac Strings*" SPE 60747, 2000.
Gorman, *Plastic Electric: Lining up the Future of Conducting Polymers* Science News, vol. 163, May 17, 2003.
Simmons et al., "*Poly(phenyllactide): Synthesis, Characterization, and Hydrolytic Degradation, Biomacromolecules*", vol. 2, No. 2, pp. 658-663, 2001.
Yin et al., "*Preparation and Characterization of Substituted Polylactides*", Americal Chemical Society, vol. 32, No. 23, pp. 7711-7718, 1999.
Yin et al., "*Synthesis and Properties of Polymers Derived from Substituted Lactic Acids*", American Chemcial Society, Ch. 12, pp. 147-159, 2001.
Cantu et al., "*Laboratory and Field Evaluation of a Combined Fluid-Loss Control Additive and Gel Breaker for Fracturing Fluids*," SPE 18211, 1990.
Love et al., "*Selectviely Placing Many Fractures in Openhole Horizontal Wells Improves Production*", SPE 50422, 1998.
McDaniel et al. "*Evolving New Stimulation Process Proves Highly Effective In Level 1 Dual-Lateral Completion*" SPE 78697, 2002.
Dechy-Cabaret et al., "*Controlled Ring-Operated Polymerization of Lactide and Glycolide*" American Chemical Society, Chemical Reviews, A-Z, AA-AD, 2004.
Funkhouser et al., "*Synthetic Polymer Fracturing Fluid For High-Temperature Applications*", SPE 80236, 2003.

*Chelating Agents*, Encyclopedia of Chemical Technology, vol. 5 (764-795).

Vichaibun et al., "*A New Assay for the Enzymatic Degradation of Polylactic Acid, Short Report*", ScienceAsia, vol. 29, pp. 297-300, 2003.

CDX Gas, CDX Solution, 2003, CDX, LLC, Available @ www.cdxgas.com/solution.html, printed pp. 1-2.

CDX Gas, "*What is Coalbed Methane?*" CDX, LLC. Available @ www.cdxgas.com/what.html, printed p. 1.

Halliburton brochure entitled "H2Zero™ Service Introducing The Next Generation of cost-Effective Conformance Control Solutions", 2002.

Halliburton brochure entitled INJECTROL® A Component: 1999.

Halliburton brochure entitled "INJECTROL® G Sealant", 1999.

Halliburton brochure entitled "INJECTROL® IT Sealant", 1999.

Halliburton brochure entitled "INJECTROL® Service Treatment", 1999.

Halliburton brochure entitled "INJECTROL® U Sealant", 1999.

Halliburton brochure entitle "Sanfix® A Resin", 1999.

Halliburton brochure entitled "Pillar Frac Stimulation Technique" Fracturing Services Technical Data Sheet, 2 pages.

Yoary Attia, et al.., "*Adsorption Thermodynamics of a Hydrophobic Polymeric Flocculant on Hydrophobic Collodial Coal Particulates,*" American Chemical Society p. 2203-2207, 1991.

Foreign Search Report and Written Opinion for PCT/GB2006/000366, Feb. 2, 2006.

U.S. Appl. No. 10/853,879, filed May 26, 2004, Nguyen et al.

U.S. Appl. No. 10/864,061, filed Jun. 9, 2004, Blauch et al.

U.S. Appl. No. 10/864,618, filed Jun. 9, 2004, Blauch et al.

*Aliphatic Polyesters: Sysnthesis, Properties and Applications*, published 2002, Advances in Polymer Science, vol. 157, Degradable Aliphatic Polyesters, Springer-Verlag by Ann-Christine Albertsson, et al.

*Recent Advances in Hydraulic Fracturin*, Gidley et al., Henry L. Doherty Memorial Fund of AIME, Society of Petroleum Engineers, 1989, Chapter 6, "Propping Agents and Fracture Conductivity", pp. 109-130.

\* cited by examiner

METHODS OF CREATING HIGH POROSITY PROPPED FRACTURES

CROSS-REFERENCE TO RELATED APPLICATION

This application is a continuation in part of U.S. application Ser. No. 10/937,076, filed on Sep. 9, 2004.

BACKGROUND

The present invention relates to high porosity propped fractures and methods of creating high porosity propped fractures in portions of subterranean formations. More particularly, the present invention relates method of using weighting agents in fracturing fluids used to create high porosity propped fractures.

Subterranean wells (such as hydrocarbon producing wells, water producing wells, and injection wells) are often stimulated by hydraulic fracturing treatments. In hydraulic fracturing treatments, a viscous fracturing fluid, which also functions as a carrier fluid, is pumped into a portion of a subterranean formation at a rate and pressure such that the subterranean formation breaks down and one or more fractures are formed. Typically, particulate solids, such as graded sand, are suspended in a portion of the fracturing fluid are then deposited in the fractures. These particulate solids, or "proppant particulates," serve to prevent the fractures from fully closing once the hydraulic pressure. By keeping the fracture from fully closing, the proppant particulates aid in forming conductive paths through which fluids may flow.

Commonly used proppant particulates generally comprise substantially spherical particles, such as graded sand, bauxite, ceramics, or even nut hulls. Generally, the proppant particulates are placed in the fracture in a concentration such that they formed a tight pack of particulates. Unfortunately, in such traditional operations, when fractures close upon the proppant particulates they can crush or become compacted, potentially forming non-permeable or low permeability masses within the fracture rather than desirable high permeability masses; such low permeability masses may choke the flow path of the fluids within the formation. Furthermore, the proppant particulates may become embedded in particularly soft formations, negatively impacting production.

The degree of success of a fracturing operation depends, at least in part, upon fracture porosity and conductivity once the fracturing operation is stopped and production is begun. Traditional fracturing operations place a large volume of proppant particulates into a fracture and the porosity of the resultant packed propped fracture is then related to the interconnected interstitial spaces between the abutting proppant particulates. Thus, the resultant fracture porosity from a traditional fracturing operation is closely related to the strength of the placed proppant particulates (if the placed particulates crush then the pieces of broken proppant may plug the interstitial spaces) and the size and shape of the placed particulate (larger, more spherical proppant particulates generally yield increased interstitial spaces between the particulates). Such traditional fracturing operations tend to result in packed fractures that have porosities ranging from about 26% to about 46%.

One way proposed to combat problems inherent in tight proppant particulate packs involves placing a much reduced volume of proppant particulates in a fracture to create what is referred to herein as a partial monolayer or "high porosity" fracture. In such operations the proppant particulates within the fracture may be widely spaced but they are still sufficient to hold the fracture open and allow for production. Such operations allow for increased fracture conductivity due, at least in part, to the fact the produced fluids may flow around widely spaced proppant particulates rather than just through the relatively small interstitial spaces in a packed proppant bed.

While this concept of partial monolayer fracturing was investigated in the 1960's, the concept has not been successfully applied for a number of reasons. One problem is that successful placement of a partial monolayer of proppant particulates presents unique challenges in the relative densities of the particulates versus the carrier fluid. Another problem lies in the fact that placing a proppant that tends to crush or embed under pressure may allow the fracture to pinch or close in places once the fracturing pressure is released. Still another problem is that particulates that could be carried in a fluid to potentially produce a high porosity fracture were then unable to support the load from the formation once the fracturing pressure was released. Attempts to solve these problems have heretofore been unsuccessful.

SUMMARY

The present invention relates to high porosity propped fractures and methods of creating high porosity propped fractures in portions of subterranean formations. More particularly, the present invention relates method of using weighting agents in fracturing fluids used to create high porosity propped fractures.

One embodiment of the present invention provides a method of forming a high porosity propped fracture in a subterranean formation, comprising: providing a slurry comprising a fracturing fluid, proppant particulates, and a weighting agent; introducing the slurry into a portion of a fracture within the subterranean formation; and, depositing the proppant particulates into the portion of the fracture within the subterranean formation so as to form a high porosity propped fracture.

Another embodiment of the present invention provides a method of fracturing a portion of a subterranean formation so as to form a high porosity propped fracture comprising: creating at least one fracture within a portion of a subterranean formation using hydraulic pressure; placing a slurry comprising a fracturing fluid, high density plastic particulates, and a weighting agent into at least a portion of the created fracture; and, depositing the high density plastic proppant particulates into a portion of the fracture so as to form a high porosity propped fracture.

Another embodiment of the present invention provides a slurry suitable for use in subterranean fracturing operations comprising: a fracturing fluid, proppant particulates, and a weighting agent.

The features and advantages of the present invention will be readily apparent to those skilled in the art upon a reading of the description of the preferred embodiments that follows.

DETAILED DESCRIPTION

The present invention relates to high porosity propped fractures and methods of creating high porosity propped fractures in portions of subterranean formations. More particularly, the present invention relates method of using weighting agents in fracturing fluids used to create high porosity propped fractures.

In certain methods of the present invention, proppant particulates are suspended in a fracturing fluid that comprises a weighting agent and then the suspended proppant particulates are sent down hole and placed into a subterranean fracture so as to create a high porosity propped fracture. The weighting agent in the fracturing fluid may be capable of acting both to increase the fluid's density (and thus the ability of the fluid to suspend particulates) and also to act as a fluid loss control material. As used herein, the term "high porosity fracture" refers to a proppant fracture having a porosity greater than about 40%.

I. High-Porosity Propped Fractures

Porosity values expressed herein are unstressed porosities, that is, the porosity before the fracture has closed or applied any substantial mechanical stress. By way of example, to find porosity in one embodiment of the present invention a 70% porosity fracture was propped using Nylon 6 proppant and, once 4,000 psi of stress was applied and the system was allowed to come to rest, the resultant porosity was 58%. In that case the unstressed porosity was 70% and the stressed porosity was 58%.

The methods of the present invention may be used, inter alia, to create high porosity fractures having increased conductivity as compared to traditional packed propped fractures. The greater conductivity is believed to be due, at least in part, to a high porosity fracture that may be formed using a lower than traditional proppant loading.

Figure 3:
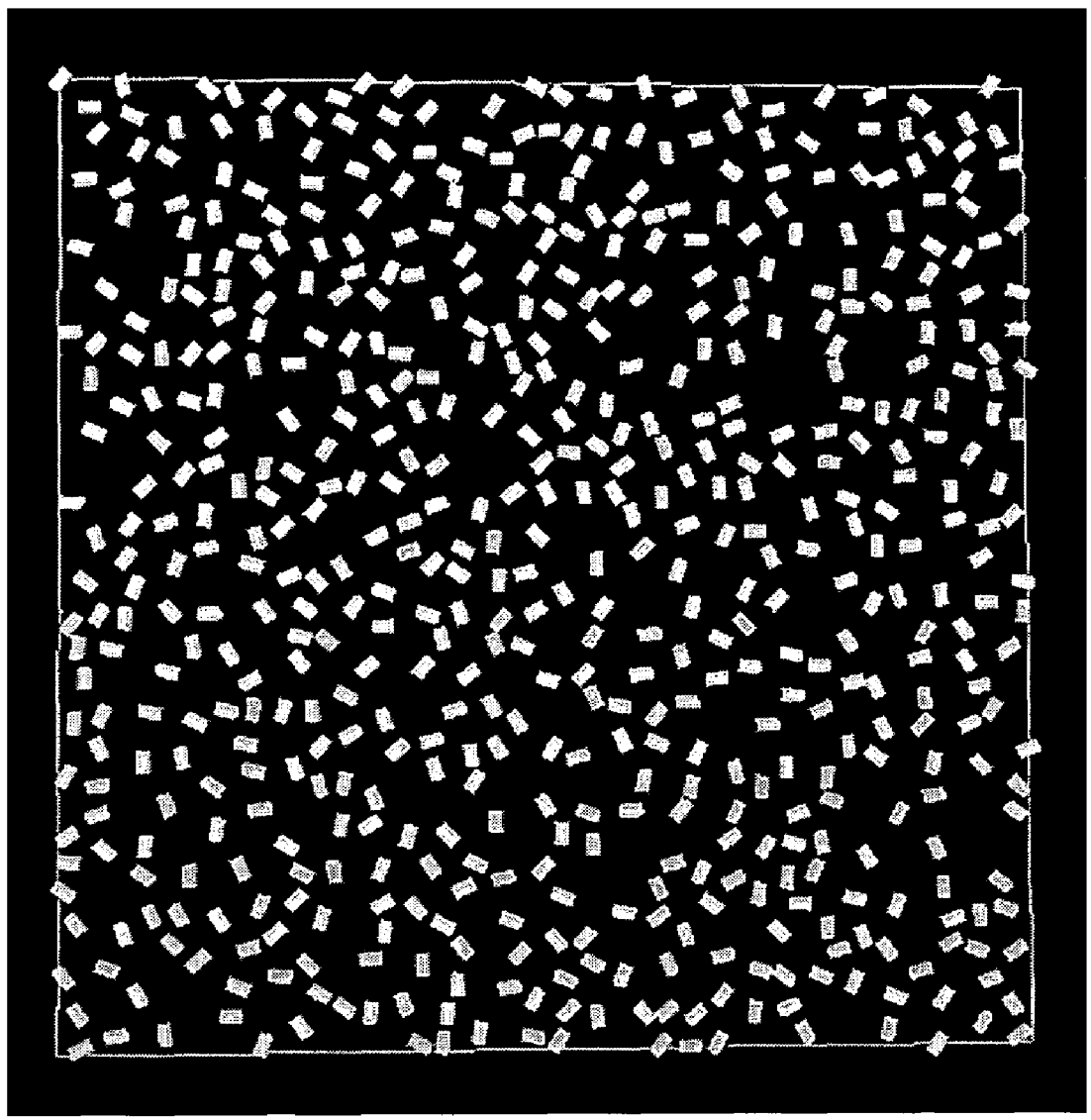
FIG. 3 shows the results of computer modeling simulating one embodiment of a high porosity propped fracture made without an adhesive substance.
Figure 4:
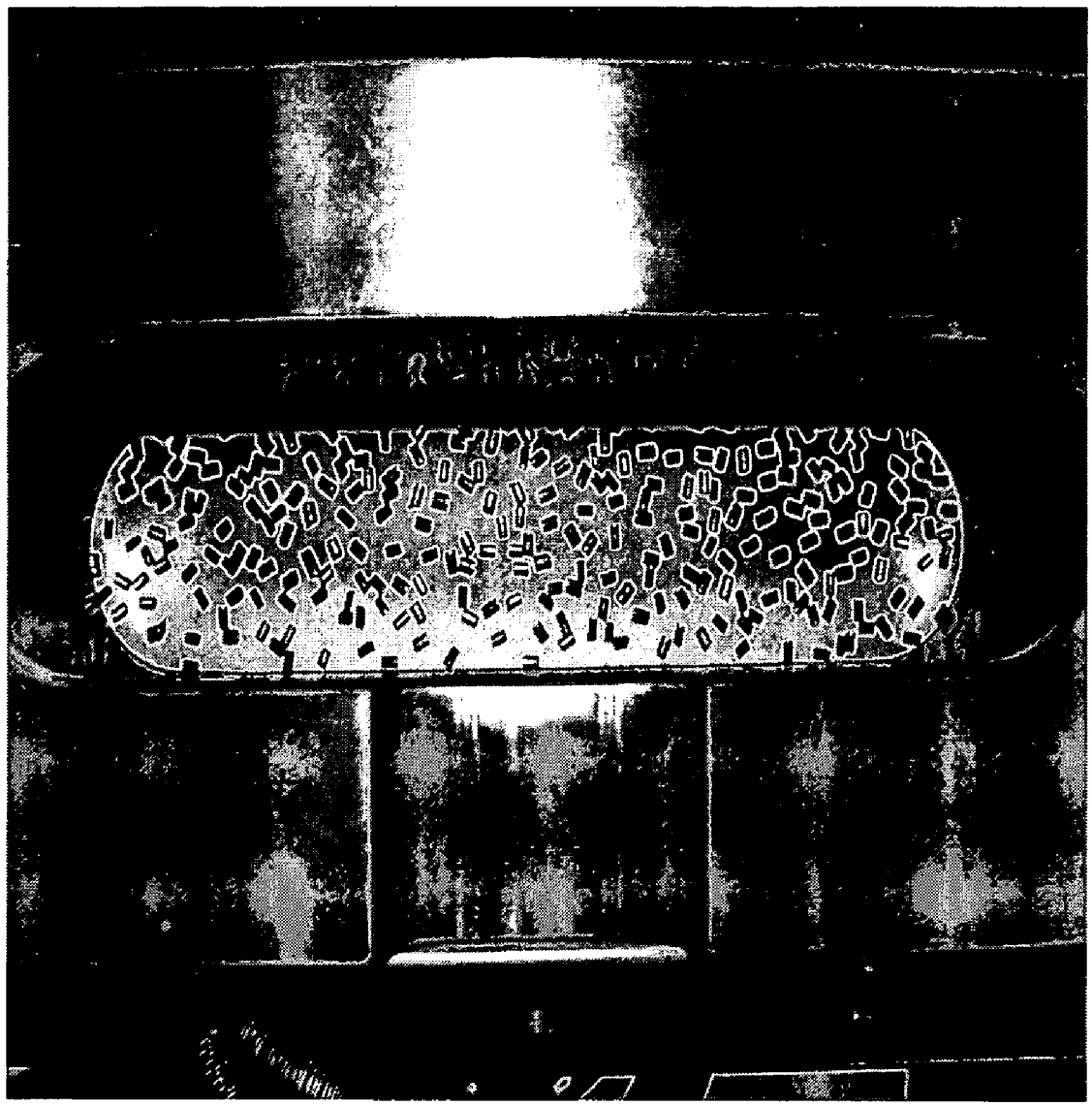
FIG. 4 shows the results of a lab test simulating one embodiment of a high porosity propped fracture made without an adhesive substance

The ability to place lower than traditional proppant loading may facilitate the formation of a conductive fracture with porosity greater than about 40% while still maintaining enough conductive channels for production. Some embodiments of the present invention may be used to form a fracture exhibiting a porosity of at least about 50%. Other embodiments of the present invention may be used to form a fracture exhibiting a porosity of at least about 60%. Other embodiments of the present invention may be used to form a fracture exhibiting a porosity of at least about 70%. Other embodiments of the present invention may be used to form a fracture exhibiting a porosity of at least about 80%. Other embodiments of the present invention may be used to form a fracture exhibiting a porosity of at least about 90%. FIGS. 3 and 4 illustrate some embodiments of arrangements of particles in a fracture having a 80% porosity.

The lower than traditional proppant loading as used in the present invention may allow for increased conductivity and increased proppant particulate performance, at least in part, because the high porosity fractures they form allow for increased levels of open channels. With a high porosity fracture there may be more open spaces in the propped fracture that may remain open, even under severe closure stresses than found in traditional, high proppant loading applications.

By increasing the percentage of open spaces within a propped fracture, the methods of the present invention may act not only to increase the available space for production but also to eliminate non-darcy effects during production. Generally, non-Darcy effects are caused by inertial forces due to expansion and contraction of the local flow inside flow channels found in typical proppant packs. The high porosity propped fractures, decrease or eliminate the cycles of expansion and contraction because the interstitial spaces found in traditional propped fractures are not present. The article, *Recent Advances in Hydraulic Fracturing*, Gidley, J. L., et al. (ed.), Society of Petroleum Engineers, Richardson, Tex. (1989) discusses non-Darcy flow and its effects on conductivity of proppant beds and fractures, its relevant teachings are hereby incorporated by reference.

Figure 5:
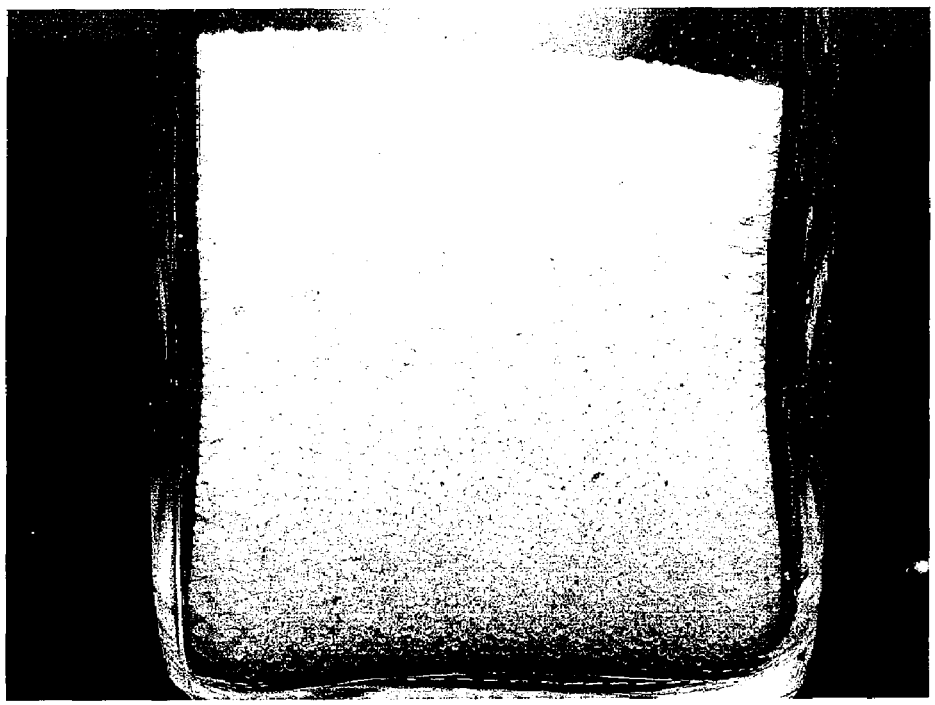
FIG. 5 shows packed 16/30 sand proppant particles forming a pack having about 40% porosity.
Figure 6:
FIG. 6 shows packed 16/20 ceramic proppant particles forming a pack having about 40% porosity.

FIG. 3 shows the results of computer modeling simulating one embodiment of a high porosity propped fracture having about 80% porosity formed using cylindrical nylon 6 proppant particulates. FIG. 4 shows the results of a lab test substantially similar to the operation modeled in FIG. 3, forming one embodiment of a high porosity propped fracture having about 80% porosity formed using cylindrical nylon 6 proppant particulates. By contrast, FIGS. 5 and 6 each show proppant particulates forming a traditional, dense pack having about 40% porosity (including both the porosity of the internal pack and that along the wall of the jar), wherein FIG. 5 is formed of 16/30 sand and FIG. 6 is formed of 16/20 ceramic proppant. Fractures held open by proppant packs of sand or ceramic proppants have an average porosity of about 40%. Notably, proppant size has little or no effect on the porosity of a packed fracture; rather, proppant size effects the permeability (and therefore the conductivity) of a propped fracture.

Figure 7:
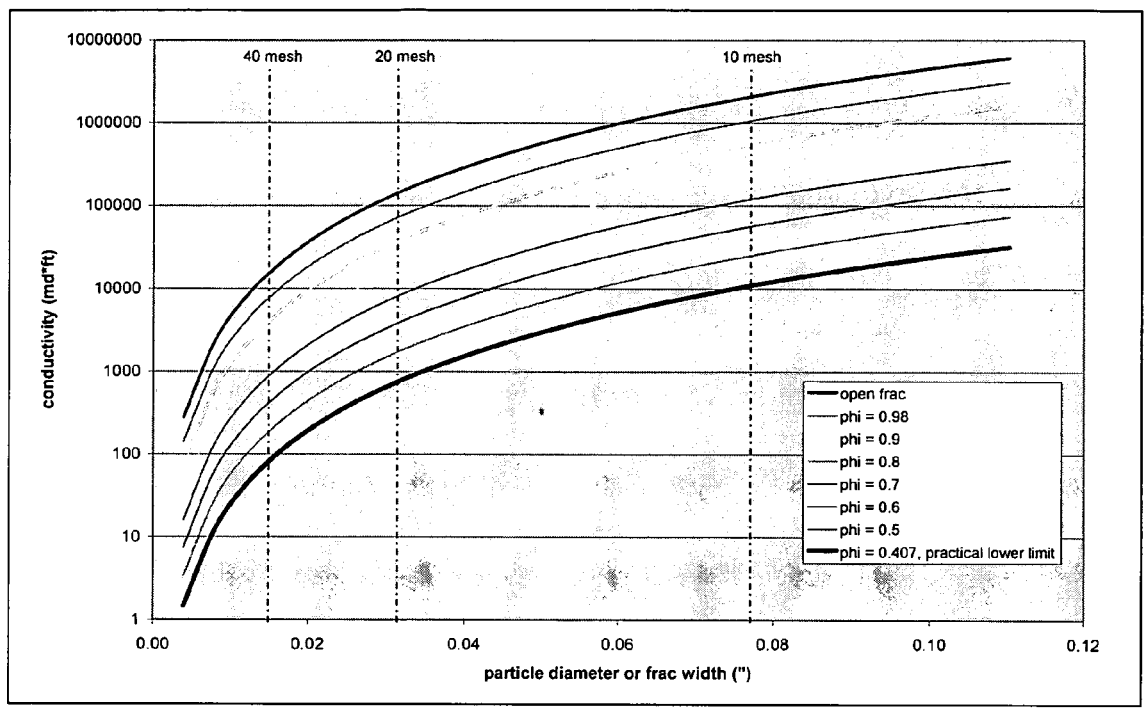
FIG. 7 shows a graph of fracture width versus conductivity with respect to fractures having various levels of porosity.

FIG. 7 shows a graph of fracture width versus conductivity with respect to fractures having various levels of porosity. As shown in FIG. 7, a porosity (phi) of 100% would correspond to a 0% proppant loading. As noted above, the practical lower limit of porosity is about 40%. A porosity value of 40% is considered reasonable for packed proppant beds and although the porosity can vary, it generally varies only within a small range (38 to 40%). Higher porosities leave more amounts of open space through which produced fluids may flow, and are therefore, desirable.

The present invention describes reduced particulate loadings to create a high porosity fracture compared to traditional fracturing applications that create packed fractures. Tables 1 and 2 provide example proppant loading schedules for a fracturing treatment. As will be understood by one skilled in the art, each operation is unique, and thus, may require its own unique proppant addition schedule. However, the example in Table 1 shows one possible addition schedule for achieving a high porosity fracture having a porosity in excess of about 90% for most of the propped fracture area. By contrast, Table 2 shows the proppant addition schedule for an operation placing a traditional packed proppant bed within a fracture that results in a packed fracture with porosity around 40% for most of the propped fracture area.

TABLE 1

High Porosity Fracture Treatment Proppant Addition Schedule

| Fluid name | Stage Volume (gal) | Proppant Concentration (lb/gal) | Treatment Rate (BPM) |
|---|---|---|---|
| Pad | 7,500 | 0.0 | 25 |
| Slurry | 4,000 | 0.05 | 25 |
| Slurry | 4,000 | 0.1 | 25 |
| Slurry | 4,000 | 0.2 | 25 |
| Slurry | 4,000 | 0.3 | 25 |
| Slurry | 3,000 | 0.4 | 25 |
| Slurry | 3,000 | 0.5 | 25 |
| Slurry | 3,000 | 0.6 | 25 |
| Flush | 3,200 | 0.0 | 25 |
| Totals | 35,700 gal | 7,100 lbs | |

TABLE 2

Conventional Treatment Proppant Addition Schedule

| Fluid name | Stage Volume (gal) | Proppant Concentration (lb/gal) | Treatment Rate (BPM) |
|---|---|---|---|
| Pad | 7,500 | 0 | 25 |
| Slurry | 4,000 | 0.5 | 25 |
| Slurry | 4,000 | 1 | 25 |
| Slurry | 4,000 | 2 | 25 |
| Slurry | 4,000 | 3 | 25 |
| Slurry | 3,000 | 4 | 25 |
| Slurry | 3,000 | 5 | 25 |
| Slurry | 3,000 | 6 | 25 |
| Flush | 3,200 | 0 | 25 |
| Totals | 35,700 gal | 71,000 lbs | |

II. Fracturing Fluids

Any fracturing fluid suitable for a fracturing or frac-packing application may be used in accordance with the teachings of the present invention, including aqueous gels, viscoelastic surfactant gels, oil gels, heavy brines, and emulsions. Suitable aqueous gels are generally comprised of water and one or more gelling agents. Suitable emulsions can be comprised of two immiscible liquids such as an aqueous liquid or gelled liquid and a hydrocarbon. Generally, suitable fracturing fluids are relatively viscous, as will be understood by one skilled in the art, increasing the viscosity of a fracturing fluid may be accomplished by many means, including, but not limited to, adding a heavy brine to the fluid, adding a polymer to the fluid, crosslinking a polymer in the fluid, or some combination thereof. In exemplary embodiments of the present invention, the fracturing fluids are aqueous gels comprised of water, a gelling agent for gelling the water and increasing its viscosity, and, optionally, a crosslinking agent for crosslinking the gel and further increasing the viscosity of the fluid. The increased viscosity of the gelled, or gelled and cross-linked, fracturing fluid, inter alia, reduces fluid loss and allows the fracturing fluid to transport significant quantities of suspended proppant particles. The water used to form the fracturing fluid may be salt water, brine, or any other aqueous liquid that does not adversely react with the other components. The density of the water can be increased to provide additional particle transport and suspension in the present invention.

A variety of gelling agents may be used, including hydratable polymers that contain one or more functional groups such as hydroxyl, carboxyl, sulfate, sulfonate, amino, or amide groups. Suitable gelling typically comprise polymers, synthetic polymers, or a combination thereof. A variety of gelling agents can be used in conjunction with the methods and compositions of the present invention, including, but not limited to, hydratable polymers that contain one or more functional groups such as hydroxyl, cis-hydroxyl, carboxylic acids, derivatives of carboxylic acids, sulfate, sulfonate, phosphate, phosphonate, amino, or amide. In certain exemplary embodiments, the gelling agents may be polymers comprising polysaccharides, and derivatives thereof that contain one or more of these monosaccharide units: galactose, mannose, glucoside, glucose, xylose, arabinose, fructose, glucuronic acid, or pyranosyl sulfate. Examples of suitable polymers include, but are not limited to, guar gum and derivatives thereof, such as hydroxypropyl guar and carboxymethylhydroxypropyl guar, and cellulose derivatives, such as hydroxyethyl cellulose. Additionally, synthetic polymers and copolymers that contain the above-mentioned functional groups may be used. Examples of such synthetic polymers include, but are not limited to, polyacrylate, polymethacrylate, polyacrylamide, polyvinyl alcohol, and polyvinylpyrrolidone. In other exemplary embodiments, the gelling agent molecule may be depolymerized. The term "depolymerized," as used herein, generally refers to a decrease in the molecular weight of the gelling agent molecule. Depolymerized gelling agent molecules are described in U.S. Pat. No. 6,488,091 issued Dec. 3, 2002 to Weaver, et al., the relevant disclosure of which is incorporated herein by reference. Suitable gelling agents generally are present in the viscosified treatment fluids of the present invention in an amount in the range of from about 0.1% to about 5% by weight of the water therein. In certain exemplary embodiments, the gelling agents are present in the viscosified treatment fluids of the present invention in an amount in the range of from about 0.01% to about 2% by weight of the water therein Crosslinking agents may be used to crosslink gelling agent molecules to form crosslinked gelling agents. Crosslinkers typically comprise at least one ion that is capable of crosslinking at least two gelling agent molecules. Examples of suitable crosslinkers include, but are not limited to, boric acid, disodium octaborate tetrahydrate, sodium diborate, pentaborates, ulexite and colemanite, compounds that can supply zirconium IV ions (such as, for example, zirconium lactate, zirconium lactate triethanolamine, zirconium carbonate, zirconium acetylacetonate, zirconium malate, zirconium citrate, and zirconium diisopropylamine lactate); compounds that can supply titanium IV ions (such as, for example, titanium lactate, titanium malate, titanium citrate, titanium ammonium lactate, titanium triethanolamine, and titanium acetylacetonate); aluminum compounds (such as, for example, aluminum lactate or aluminum citrate); antimony compounds; chromium compounds; iron compounds; copper compounds; zinc compounds; or a combination thereof. An example of a suitable commercially available zirconium-based crosslinker is "CL-24" available from Halliburton Energy Services, Inc., Duncan, Okla. An example of a suitable commercially available titanium-based crosslinker is "CL-39" available from Halliburton Energy Services, Inc., Duncan Okla. Suitable crosslinkers generally are present in the viscosified treatment fluids of the present invention in an amount sufficient to provide, inter alia, the desired degree of crosslinking between gelling agent molecules. In certain exemplary embodiments of the present invention, the crosslinkers may be present in an amount in the range from about 0.001% to about 10% by weight of the water in the fracturing fluid. In certain exemplary embodiments of the present invention, the crosslinkers may be present in the viscosified treatment fluids of the present invention in an amount in the range from about 0.01% to about 1% by weight of the water therein. Individuals skilled in the art, with the benefit of this disclosure, will recognize the exact type and amount of crosslinker to use depending on factors such as the specific gelling agent, desired viscosity, and formation conditions.

The gelled or gelled and cross-linked fracturing fluids may also include internal delayed gel breakers such as enzyme, oxidizing, acid buffer, or temperature-activated gel breakers. The gel breakers cause the viscous carrier fluids to revert to thin fluids that can be produced back to the surface after they have been used to place proppant particles in subterranean fractures. The gel breaker used is typically present in the fracturing fluid in an amount in the range of from about 0.5% to about 10% by weight of the gelling agent. The fracturing fluids may also include one or more of a variety of well-known additives, such as gel stabilizers, fluid loss control additives, clay stabilizers, bactericides, and the like.

III. Weighting Agents

Weighting agents suitable for use in the present invention are particles capable of acting to increase the density of the fracturing fluid. Moreover, weighting agents suitable for use in the present invention are particles capable of acting as fluid loss control materials. Suitable weighting agents generally comprise small sized particulates such as silica flour. Generally, the size distribution of the weighting agent should be selected such that it is capable of acting as a fluid loss control material for the formation being fractured; that is, the size of the weighting agent should be chosen to based, at least in part, on the pore size distribution of the formation being fractured. The common wisdom has long held that the presence of particles small enough to act as fluid loss control materials should be avoided in fracturing fluids. This notion is primarily related to the fact that such materials we known to clog the pore throats between the packed particles in the resultant packed proppant bed and thus to increase the resistance to flow of produced fluids through the bed. However, in the partial monolayer high porosity propped fracture created in the present invention pore throats are only formed in those instances wherein multiple proppant particulates group together, the expanse of the fracture is open space. Thus, there is little or no concern of clogging pore throats in a high porosity propped fracture of the present invention.

By increasing the density of a fracturing fluid, suitable weighting agents may also act to increase the proppant suspending capacity of a fracturing fluid comprising the weighting agent. In some embodiments of the present invention, the weighting agent may be used only in combination with a suitable viscosifier to increase the fracturing fluid's density and proppant suspending capacity. In fact, in some embodiments wherein it may be possible to use a drilling mud to fracture a formation and to place a high porosity proppant pack in the formation. In some embodiments of the present invention, the chosen weighting agent(s) may be added to the fracturing fluid in an amount sufficient to make the fracturing fluid density substantially similar to the density of the chosen proppant particulates.

Weighting agents suitable for use in the present invention include, but are not limited to, silica flour, particulate stone (such as ground and sized limestone or marble), graphitic carbon, ground battery casings, ground tires, calcium carbonate, barite, glass, mica, ceramics, ground drill cuttings, combinations thereof, and the like.

IV. Suitable Proppant Particulates

A. Proppant Particulates—Size and Shape

Proppant particulates suitable for use in the methods of the present invention may be of any size and shape combination known in the art as suitable for use in a fracturing operation. Generally, where the chosen proppant is substantially spherical, suitable proppant particulates have a size in the range of from about 2 to about 400 mesh, U.S. Sieve Series. In some embodiments of the present invention, the proppant particulates have a size in the range of from about 8 to about 120 mesh, U.S. Sieve Series.

In some embodiments of the present invention it may be desirable to use substantially non-spherical proppant particulates. Suitable substantially non-spherical proppant particulates may be cubic, polygonal, fibrous, or any other non-spherical shape. Such substantially non-spherical proppant particulates may be, for example, cubic-shaped, rectangular shaped, rod shaped, ellipse shaped, cone shaped, pyramid shaped, or cylinder shaped. That is, in embodiments wherein the proppant particulates are substantially non-spherical, the aspect ratio of the material may range such that the material is fibrous to such that it is cubic, octagonal, or any other configuration. Substantially non-spherical proppant particulates are generally sized such that the longest axis is from about 0.02 inches to about 0.3 inches in length. In other embodiments, the longest axis is from about 0.05 inches to about 0.2 inches in length. In one embodiment, the substantially non-spherical proppant particulates are cylindrical having an aspect ratio of about 1.5 to 1 and about 0.08 inches in diameter and about 0.12 inches in length. In another embodiment, the substantially non-spherical proppant particulates are cubic having sides about 0.08 inches in length. The use of substantially non-spherical proppant particulates may be desirable in some embodiments of the present invention because, among other things, they may provide a lower rate of settling when slurried into a fluid as is often done to transport proppant particulates to desired locations within subterranean formations. By so resisting settling, substantially non-spherical proppant particulates may provide improved proppant particulate distribution as compared to more spherical proppant particulates.

In poorly consolidated formations (that is, formations that, when assessed, fail to produce a core sample that can be satisfactorily drilled, cut, etc.) the use of substantially non-spherical proppant particulates may also help to alleviate the embedment of proppant particulates into the formation surfaces (such as a fracture face). As is known by one skilled in the art, when substantially spherical proppant particulates are placed against a formation surface under stress, such as when they are used to prop a fracture, they are subject to point loading. By contrast, substantially non-spherical proppant particulates may be able to provide a greater surface area against the formation surface and thus may be better able to distribute the load of the closing fracture.

B. Proppant Particulates—Materials of Manufacture

Proppant particulates suitable for use in the present invention include graded sand, resin coated sand, bauxite, ceramic materials, glass materials, walnut hulls, polymeric materials, resinous materials, rubber materials, and the like. In some embodiments of the present invention, the proppant particulates suitable for use in the present invention are composed of at least one high density plastic. As used herein, the term "high density plastic" refers to a plastic having a specific gravity of greater than about 1. The preferable density range is from about 1 to about 2. More preferably the range is from about 1 to about 1.3. The most preferable is from about 1.1 to 1.2. In addition to being a high density plastic, plastics suitable for use in the present invention generally exhibit a crystallinity of greater than about 10%. In some embodiments, the high density plastic used to form the proppant particulates of the present invention exhibits a crystallinity of greater than about 20%. While the material is referred to as "high density," it will be readily understood by one skilled in the art that the density is "high" relative to other plastics, but may be low as compared to traditional proppant particulate densities. For example, Ottawa sand may exhibit a specific gravity of about 2.65 whereas man-made ceramic proppants generally have specific gravities ranging from about 2.7 to about 3.6. The relatively low density of the high density plastics used to create the proppant particulates of the present invention may be beneficial to an even distribution when the proppant particulates are slurried into a fluid such as a fracturing fluid. Such even distribution may be particularly helpful in forming a high porosity proppant pack that is capable of holding open the majority of a fracture. Uneven distribution could result in a situation wherein a portion of a fracture is propped while another portion is substantially void of proppant particulates and thus, does not remain open once the hydraulic pressure is released.

Some well-suited high density plastic materials include polyamide 6 (Nylon 6), polyamide 66 (Nylon 6/6), acrylic, acrylonitrile butadiene styrene (ABS), ethylene vinyl alcohol, polycarbonate/PET polyester blend, polyethylene terephthalate (PET), unreinforced polycarbonate/polybutylene terephthalate (PC/PBT) blend, PETG copolyester, polyetherimide, polyphenylene ether, molded polyphenylene sulfide (PPS), heat resistant grade polystyrene, polyvinylbenzene, polyphenylene oxide, a blend of polyphenylene oxide and nylon 6/6, acrylonitrile-butadiene-styrene, polyvinylchloride, fluoroplastics, polysulfide, polypropylene, styrene acrylonitrile, polystyrene, phenylene oxide, polyolefins, polystyrene divinylbenzene, polyfluorocarbons, polyethers etherketones, polyamide imides, and combinations thereof. Some other well-suited high density plastic materials include oil-resistant thermoset resins such as acrylic-based resins, epoxy-based resins, furan-based resins, phenolic-based resins, phenol/phenol formaldehyde/furfuryl alcohol resins, polyester resins, and combinations thereof.

In some embodiments of the present invention it may be desirable to reinforce the proppant particulates made of high density plastic to increase their resistance to a crushing or deforming force. Suitable reinforcing materials include high strength particles such as bauxite, nut hulls, ceramic, metal, glass, sand, asbestos, mica, silica, alumina, and any other available material that is smaller in size than the desired, final high density plastic proppant particulate and that is capable of adding structural strength to the desired, final high density plastic proppant particulate. In some embodiments of the present invention the reinforcing material may be a fibrous material such as glass fibers or cotton fibers. Preferably, the reinforcing material is chosen so as to not unduly increase the specific gravity of the final proppant particulate.

One benefit of using proppant particulates formed from high density plastic is that they may be created on-the-fly during a fracturing or frac-packing operation. U.S. patent application Ser. No. 10/853,879 filed May 26, 2004 and titled "On-The-Fly Preparation of Proppant and its Use in Subterranean Operations," the relevant disclosure of which is hereby incorporated by reference, describes methods of creating proppant particulates from thermoplastic materials on-the-fly. As described in that application, one example of a method for preparing proppant on-the-fly generally comprises providing a mixture comprising a thermoplastic/thermosetting polymer, and a filler, heating the resin mixture, extruding, atomizing, or spraying the mixture to particulate form into a well bore containing a treatment fluid; and allowing the extruded particulate to substantially cure and form proppant particles. This method relies, at least in part, on the ability of thermoplastic/thermosetting materials to be extruded from a liquid form at an elevated temperature, and then as the material cools, to then harden and form into a solid material. The thermoplastic or thermosetting proppant particulates can be prepared on-the-fly, according to the present invention, to a suitable size and shape.

Density and strength of proppant particulates formed from thermoplastic/thermosetting materials may be customized to meet the fracturing designs and well conditions. To help eliminate the problems that may be caused by large particle size, in one embodiment the on-the-fly thermoplastic proppant particulates may be introduced into the fracturing fluid at the discharge side of the pump. As will be recognized by one skilled in the art, during pumping of such on-the-fly proppant particulates (particularly where the flow passes through one or more perforations), the proppant particulates may break into smaller sizes as a result of high shear as they are being placed inside a portion of a subterranean formation.

V. Adhesive Substances Suitable for Use in the Present Invention

In some embodiments, the proppant particulates are coated with an adhesive substance, so that they will have the tendency to adhere to one another when they come into contact. The adhesive should be strong enough that the proppant particulates remain clustered together while under static condition or under low shear rates. As the shear rate increases, the proppant clusters or aggregates may become dispersed into smaller clusters or even individual proppant particulates. This phenomenon may repeat again and again from the time the coated proppant is introduced into the fracturing fluid, pumped into the well bore and fracture, and even after being placed inside the fracture. In some embodiments, coating the proppant particulates with an adhesive substance may (via the tacky nature of the adhesive substance) encourage the formation of aggregates of proppant particulates that may then form pillars within the fracture. As used herein, the term "adhesive substance" refers to a material that is capable of being coated onto a particulate and that exhibits a sticky or tacky character such that the proppant particulates that have adhesive thereon have a tendency to create clusters or aggregates. As used herein, the term "tacky," in all of its forms, generally refers to a substance having a nature such that it is (or may be activated to become) somewhat sticky to the touch.

Figure 1:
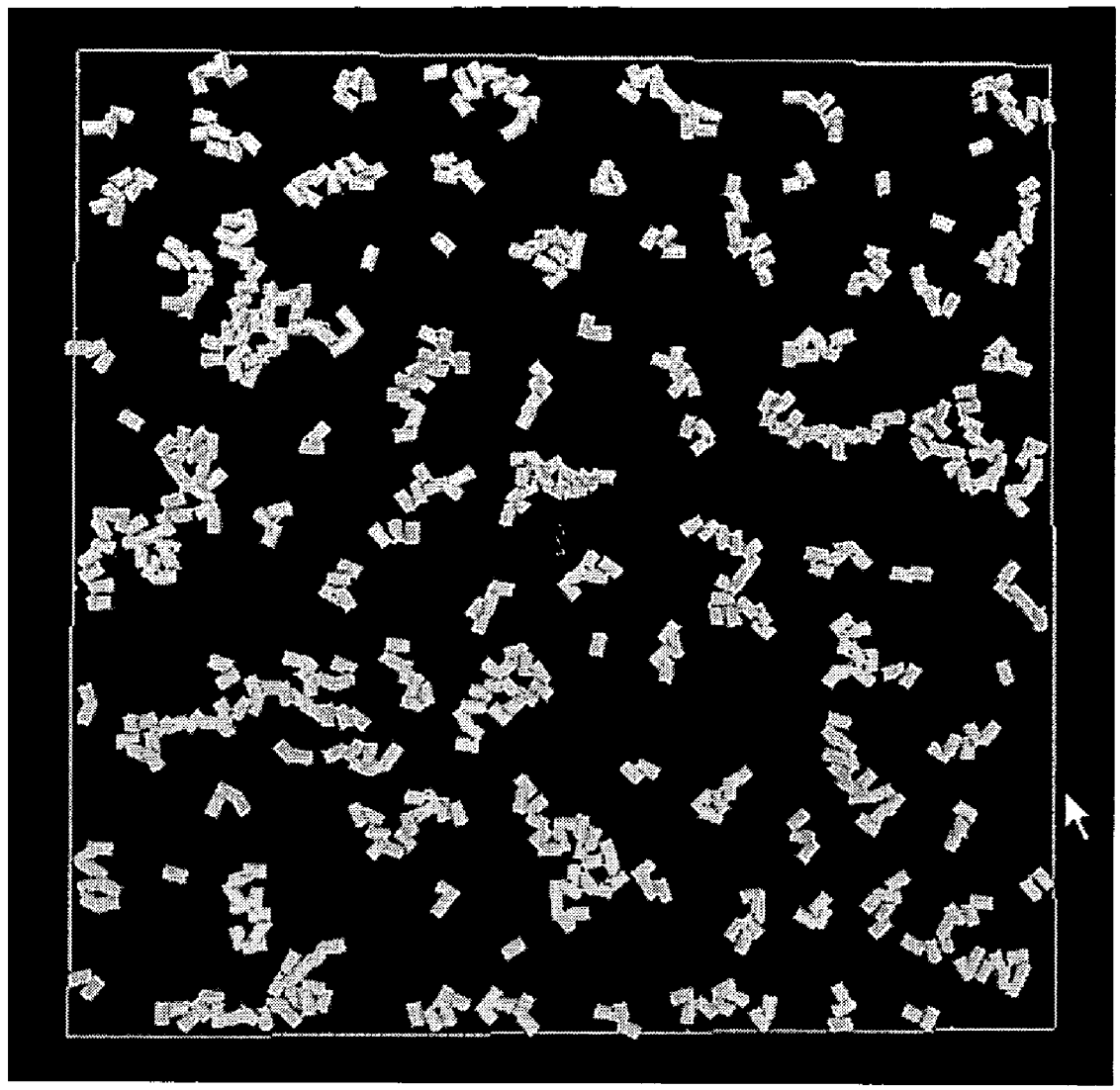
FIG. 1 shows the results of computer modeling simulating one embodiment of a high porosity propped fracture made using an adhesive substance.
Figure 2:
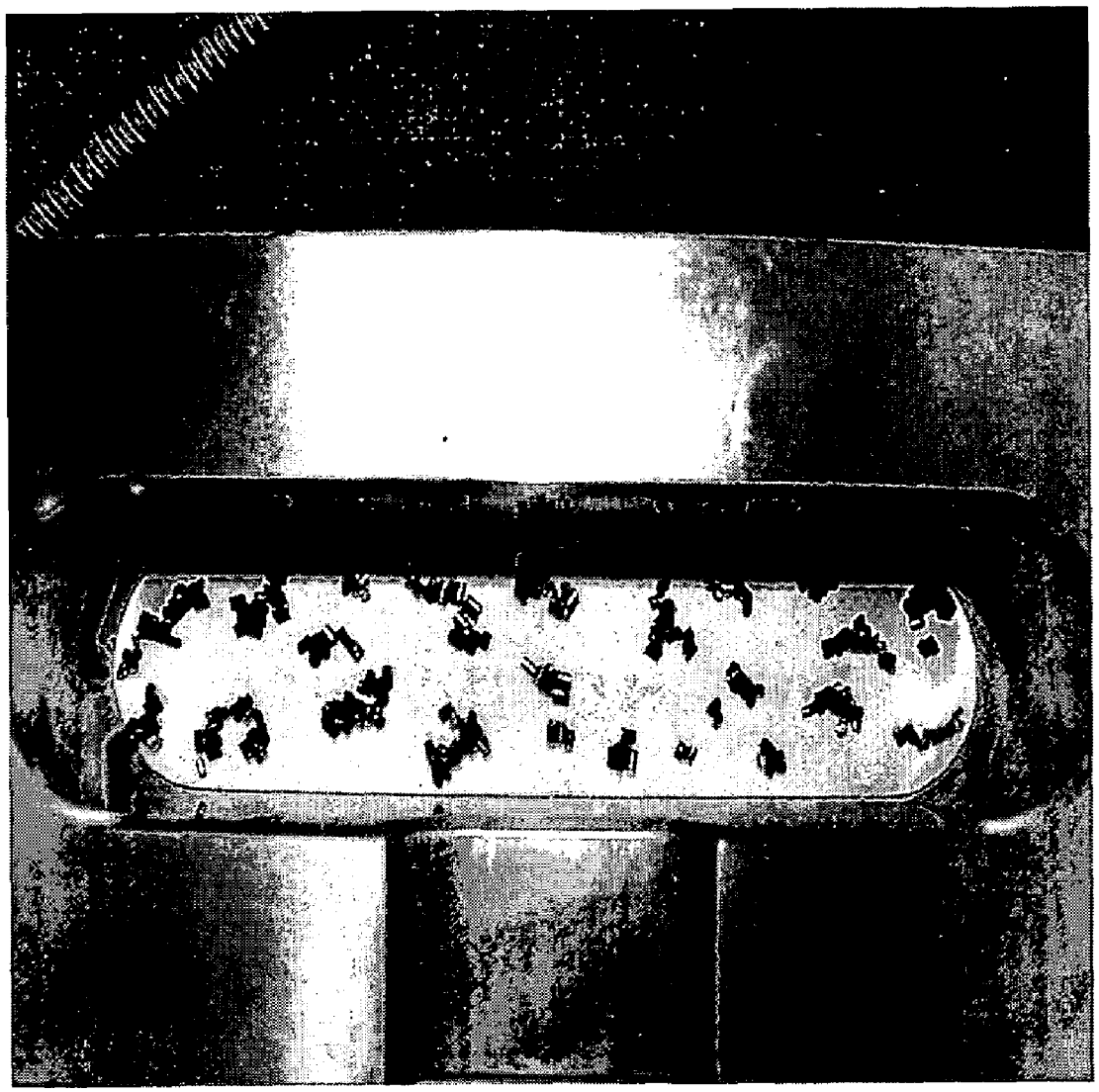
FIG. 2 shows the results of a lab test simulating one embodiment of a high porosity propped fracture made using an adhesive substance.

FIGS. 1 and 2 illustrate the formation of aggregates of proppant particulates coated with an adhesive substance. FIGS. 1 and 2 illustrate experiments designed just as FIGS. 3 and 4 (discussed above) with the one exception that the embodiments show in FIGS. 1 and 2 use proppant particulates coated with an adhesive substance. FIG. 1 shows the results of computer modeling simulating one embodiment of a high porosity propped fracture having about 80% porosity formed using cylindrical nylon 6 proppant particulates coated with 2% by weight of the proppant particulates an adhesive substance (Sandwedge®, commercially available from Halliburton Energy Services, Duncan Okla.). FIG. 2 shows the results of a lab test substantially similar to the operation modeled in FIG. 1, forming one embodiment of a high porosity propped fracture having about 80% porosity formed using cylindrical nylon 6 proppant particulates coated with 2% by weight of the proppant particulates an adhesive substance (Sandwedge®, commercially available from Halliburton Energy Services, Duncan Okla.).

Adhesive substances suitable for use in the present invention include non-aqueous tackifying agents; aqueous tackifying agents; silyl-modified polyamides; and curable resin compositions that are capable of curing to form hardened substances. In addition to encouraging the proppant particulates to form aggregates, the use of an adhesive substance may yield a propped fracture that experiences very little or no undesirable proppant flow back. As described in more detail above, the application of an adhesive substance to the proppant particulates used to create a high porosity fracture may aid in the formation of aggregates that increase the ability of a small amount of proppant particulates to effectively hold open a fracture for production. Adhesive substances may be applied on-the-fly, applying the adhesive substance to the proppant particulate at the well site, directly prior to pumping the fluid-proppant mixture into the well bore.

A. Adhesive Substances—Non-Aqueous Tackifying Agents

Tackifying agents suitable for use in the consolidation fluids of the present invention comprise any compound that, when in liquid form or in a solvent solution, will form a non-hardening coating upon a particulate. A particularly preferred group of non-aqueous tackifying agents comprise polyamides that are liquids or in solution at the temperature of the subterranean formation such that they are, by themselves, non-hardening when introduced into the subterranean formation. A particularly preferred product is a condensation reaction product comprised of commercially available polyacids and a polyamine. Such commercial products include compounds such as mixtures of $C_{36}$ dibasic acids containing some trimer and higher oligomers and also small amounts of monomer acids that are reacted with polyamines. Other polyacids include trimer acids, synthetic acids produced from fatty acids, maleic anhydride, acrylic acid, and the like. Such acid compounds are commercially available from companies such as Witco Corporation, Union Camp, Chemtall, and Emery Industries. The reaction products are available from, for example, Champion Technologies, Inc. and Witco Corporation. Additional compounds which may be used as tackifying compounds include liquids and solutions of, for example, polyesters, polycarbonates and polycarbamates, natural resins such as shellac and the like. Other suitable tackifying agents are described in U.S. Pat. No. 5,853,048 issued to Weaver, et al. and U.S. Pat. No. 5,833,000 issued to Weaver, et al., the relevant disclosures of which are herein incorporated by reference.

Non-aqueous tackifying agents suitable for use in the present invention may be either used such that they form non-hardening coating or they may be combined with a multifunctional material capable of reacting with the non-aqueous tackifying compound to form a hardened coating. A "hardened coating" as used herein means that the reaction of the tackifying compound with the multifunctional material will result in a substantially non-flowable reaction product that exhibits a higher compressive strength in a consolidated agglomerate than the tackifying compound alone with the particulates. In this instance, the tackifying agent may function similarly to a hardenable resin. Multifunctional materials suitable for use in the present invention include, but are not limited to, aldehydes such as formaldehyde, dialdehydes such as glutaraldehyde, hemiacetals or aldehyde releasing compounds, diacid halides, dihalides such as dichlorides and dibromides, polyacid anhydrides such as citric acid, epoxides, furfuraldehyde, glutaraldehyde or aldehyde condensates and the like, and combinations thereof. In some embodiments of the present invention, the multifunctional material may be mixed with the tackifying compound in an amount of from about 0.01 to about 50 percent by weight of the tackifying compound to effect formation of the reaction product. In some preferable embodiments, the compound is present in an amount of from about 0.5 to about 1 percent by weight of the tackifying compound. Suitable multifunctional materials are described in U.S. Pat. No. 5,839,510 issued to Weaver, et al., the relevant disclosure of which is herein incorporated by reference. Other suitable tackifying agents are described in U.S. Pat. No. 5,853,048 issued to Weaver, et al.

Solvents suitable for use with the non-aqueous tackifying agents of the present invention include any solvent that is compatible with the tackifying agent and achieves the desired viscosity effect. The solvents that can be used in the present invention preferably include those having high flash points (most preferably above about 125° F.). Examples of solvents suitable for use in the present invention include, but are not limited to, butylglycidyl ether, dipropylene glycol methyl ether, butyl bottom alcohol, dipropylene glycol dimethyl ether, diethyleneglycol methyl ether, ethyleneglycol butyl ether, methanol, butyl alcohol, isopropyl alcohol, diethyleneglycol butyl ether, propylene carbonate, d'limonene, 2-butoxy ethanol, butyl acetate, furfuryl acetate, butyl lactate, dimethyl sulfoxide, dimethyl formamide, fatty acid methyl esters, and combinations thereof. It is within the ability of one skilled in the art, with the benefit of this disclosure, to determine whether a solvent is needed to achieve a viscosity suitable to the subterranean conditions and, if so, how much.

B. Adhesive Substances—Aqueous Tackifying Agents

Suitable aqueous tackifying agents are capable of forming at least a partial coating upon the surface of a particulate (such as a proppant particulate). Generally, suitable aqueous tackifying agents are not significantly tacky when placed onto a particulate, but are capable of being "activated" (that is destabilized, coalesced and/or reacted) to transform the compound into a sticky, tackifying compound at a desirable time. Such activation may occur before, during, or after the aqueous tackifying agent is placed in the subterranean formation. In some embodiments, a pretreatment may be first contacted with the surface of a particulate to prepare it to be coated with an aqueous tackifying agent. Suitable aqueous tackifying agents are generally charged polymers that comprise compounds that, when in an aqueous solvent or solution, will form a non-hardening coating (by itself or with an activator) and, when placed on a particulate, will increase the continuous critical resuspension velocity of the particulate when contacted by a stream of water (further described in Example 7). The aqueous tackifying agent may enhance the grain-to-grain contact between the individual particulates within the formation (be they proppant particulates, formation fines, or other particulates), helping bring about the consolidation of the particulates into a cohesive, flexible, and permeable mass.

Examples of aqueous tackifying agents suitable for use in the present invention include, but are not limited to, acrylic acid polymers, acrylic acid ester polymers, acrylic acid derivative polymers, acrylic acid homopolymers, acrylic acid ester homopolymers (such as poly(methyl acrylate), poly (butyl acrylate), and poly(2-ethylhexyl acrylate)), acrylic acid ester co-polymers, methacrylic acid derivative polymers, methacrylic acid homopolymers, methacrylic acid ester homopolymers (such as poly(methyl methacrylate), poly(butyl methacrylate), and poly(2-ethylhexyl methacrylate)), acrylamido-methyl-propane sulfonate polymers, acrylamido-methyl-propane sulfonate derivative polymers, acrylamido-methyl-propane sulfonate co-polymers, and acrylic acid/acrylamido-methyl-propane sulfonate co-polymers and combinations thereof. Methods of determining suitable aqueous tackifying agents and additional disclosure on aqueous tackifying agents can be found in U.S. patent application Ser. No. 10/864,061 and filed Jun. 9, 2004 and U.S. patent application Ser. No. 10/864,618 and filed Jun. 9, 2004 the relevant disclosures of which are hereby incorporated by reference.

C. Adhesive Substances—Silyl-Modified Polyamides

Silyl-modified polyamide compounds suitable for use as an adhesive substance in the methods of the present invention may be described as substantially self-hardening compositions that are capable of at least partially adhering to particulates in the unhardened state, and that are further capable of self-hardening themselves to a substantially non-tacky state to which individual particulates such as formation fines will not adhere to, for example, in formation or proppant pack pore throats. Such silyl-modified polyamides may be based, for example, on the reaction product of a silating compound with a polyamide or a mixture of polyamides. The polyamide or mixture of polyamides may be one or more polyamide intermediate compounds obtained, for example, from the reaction of a polyacid (e.g., diacid or higher) with a polyamine (e.g., diamine or higher) to form a polyamide polymer with the elimination of water. Other suitable silyl-modified polyamides and methods of making such compounds are described in U.S. Pat. No. 6,439,309 issued to Matherly, et al., the relevant disclosure of which is herein incorporated by reference.

D. Adhesive Substances—Curable Resins

Resins suitable for use in the consolidation fluids of the present invention include all resins known in the art that are capable of forming a hardened, consolidated mass. Many such resins are commonly used in subterranean consolidation operations, and some suitable resins include two component epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, and mixtures thereof. Some suitable resins, such as epoxy resins, may be cured with an internal catalyst or activator so that when pumped down hole, they may be cured using only time and temperature. Other suitable resins, such as furan resins generally require a time-delayed catalyst or an external catalyst to help activate the polymerization of the resins if the cure temperature is low (i.e., less than 250° F.), but will cure under the effect of time and temperature if the formation temperature is above about 250° F., preferably above about 300° F. It is within the ability of one skilled in the art, with the benefit of this disclosure, to select a suitable resin for use in embodiments of the present invention and to determine whether a catalyst is required to trigger curing.

Any solvent that is compatible with the resin and achieves the desired viscosity effect is suitable for use in the present invention. Preferred solvents include those listed above in connection with tackifying compounds. It is within the ability of one skilled in the art, with the benefit of this disclosure, to determine whether and how much solvent is needed to achieve a suitable viscosity.

To facilitate a better understanding of the present invention, the following examples of preferred embodiments are given. In no way should the following examples be read to limit or define the scope of the invention.

EXAMPLES

Table 3 illustrates the conductivity that may be achieved when forming high porosity propped fractures of the present invention. The data shown in Table 3 represents a high porosity propped fracture comprising proppant particulates having a flattened pillow shape (substantially non-spherical) at a surface area concentration of about 0.09 pounds per square foot versus substantially spherical 20/40 mesh Ottawa sand at about two pounds per square foot and not having an adhesive coating. At a closure stress of about 2000 psi and at 105° F., a high porosity fracture formed using proppant particulates of the present invention has about ten times the conductivity of a pack formed from 20/40 mesh Ottawa sand at about two pounds per square foot. At a closure stress of about 3000 psi and at 150° F., a high porosity fracture formed using proppant particulates of the present invention was over two and a half times as conductive as the pack formed from 20/40 mesh Ottawa sand at about two pounds per square foot. At a closure stress of about 4000 psi and at 150° F., a high porosity fracture formed using proppant particulates of the present invention was over two and a quarter times as conductive as the pack formed from 20/40 mesh Ottawa sand at about two pounds per square foot. The high porosity fracture formed using proppant particulates of the present invention shows a porosity of about 70% at the start and reduced to about 58% at a closure stress of about 4000 psi and at 150° F.

TABLE 3

Fracture conductivity data for flattened pillow shaped particles and conventional 20/40 mesh sand.

| | Conductivity (md-ft) | |
| --- | --- | --- |
| Closure stress (psi) and Temperature (° F.) | 2.78 gm Nylon 6X (70% porosity fracture) | 20/40 Sand Packed Fracture (40% porosity fracture) |
| 2000 and 105° | 38965 | 3981 |
| 2500 and 105° | 27722 | — |
| 3000 and 105° | 20798 | — |
| 3000 and 150° | 9194 | 3531 |
| 4000 and 150° | 6695 | 2939 |

Table 4 shows data for another material that can be used (cylindrical particles) for the present invention. Here the created fracture porosity ranges from 80% to 88%. The higher porosity fracture provides the greatest conductivity values. The addition of an adhesive agent (Sandwedge®, commercially available from Halliburton Energy Services, Duncan Okla.) to create clusters shows there is additional increased conductivity due to larger channels being created. The porosity remains at 80% but the conductivity is increased due to the large channels.

TABLE 4

Fracture conductivity data for cylindrical particles in two concentrations and conventional 20/40 mesh sand

| Closure stress (psi) and Temperature (° F.) | Conductivity (md-ft) | | | |
|---|---|---|---|---|
| | 2.78 gm Nylon 6 (80% porosity fracture) | 2.78 gm Nylon 6 w/2% adhesive agent (80% porosity fracture) | 1.85 gm Nylon 6 (88% porosity fracture) | 20/40 Sand Packed Fracture (40% porosity fracture) |
| 2000 and 105° | 12863 | 44719 | 19950 | 3981 |
| 2500 and 105° | 11207 | 35579 | 15603 | — |
| 3000 and 105° | 8789 | 29808 | 11975 | — |
| 3000 and 150° | — | 18375 | 5574 | 3531 |
| 4000 and 150° | — | 15072 | 3277 | 2939 |

Therefore, the present invention is well adapted to attain the ends and advantages mentioned as well as those that are inherent therein. While numerous changes may be made by those skilled in the art, such changes are encompassed within the spirit of this invention as defined by the appended claims.

What is claimed is:

1. A method of forming a high porosity propped fracture in a subterranean formation, comprising:
    providing a slurry comprising a fracturing fluid, proppant particulates, and a weighting agent;
    introducing the slurry into a portion of a fracture within the subterranean formation; and,
    depositing the proppant particulates into the portion of the fracture within the subterranean formation so as to form a high porosity propped fracture without the addition of an acidic afterflush.

2. The method of claim 1 wherein the weighting agent is selected from the group consisting of: silica flour, particulate stone, graphitic carbon, ground battery casings, ground tires, calcium carbonate, barite, glass, mica, ceramics, ground drill cuttings, and combinations thereof.

3. The method of claim 1 wherein the weighting agent is a fluid loss control agent or a density increasing agent.

4. The method of claim 1 wherein the high porosity propped fracture has a porosity of at least about 50%.

5. The method of claim 1 wherein at least a portion of the proppant particulates are selected from the group consisting of: high density plastic, graded sand, resin coated sand, bauxite, a ceramic material, a glass material, nut hulls, a polymeric material, a resinous material, a rubber material, and a combination thereof.

6. The method of claim 1 wherein at least a portion of the proppant particulates are substantially coated with an adhesive substance selected from the group consisting of: a non-aqueous tackifying agent; an aqueous tackifying agent; a silyl-modified polyamide; a curable resin composition; and a combination thereof.

7. The method of claim 1 wherein the fracturing fluid is selected from the group consisting of: a drilling fluid, water, an aqueous gel, a viscoelastic surfactant gel, an oil gel, a heavy brine, an emulsion, and a combination thereof.

8. A method of fracturing a portion of a subterranean formation so as to form a high porosity propped fracture comprising:
    creating at least one fracture within a portion of a subterranean formation using hydraulic pressure;
    placing a slurry comprising a fracturing fluid, high density plastic proppant particulates, and a weighting agent into at least a portion of the fracture; and,
    depositing the high density plastic proppant particulates into a portion of the fracture so as to form a high porosity propped fracture.

9. The method of claim 8 wherein the weighting agent is selected from the group consisting of: silica flour, particulate stone, graphitic carbon, ground battery casings, ground tires, calcium carbonate, barite, glass, mica, ceramics, ground drill cuttings, and combinations thereof.

10. The method of claim 8 wherein the weighting agent is a fluid loss control agent or a density increasing agent.

11. The method of claim 8 wherein the high porosity propped fracture has a porosity of at least about 50%.

12. The method of claim 8 wherein the slurry further comprises proppant particulates selected from the group consisting of: graded sand, resin coated sand, bauxite, a ceramic material, a glass material, nut hulls, a polymeric material, a resinous material, a rubber material, and a combination thereof.

13. The method of claim 8 wherein at least a portion of the high density plastic proppant particulates are substantially coated with an adhesive substance selected from the group consisting of: a non-aqueous tackifying agent; an aqueous tackifying agent; a silyl-modified polyamide; a curable resin composition; and a combination thereof.

14. The method of claim 8 wherein the fracturing fluid is selected from the group consisting of: a drilling fluid, water, an aqueous gel, a viscoelastic surfactant gel, an oil gel, a heavy brine, an emulsion, and a combination thereof.

15. A method of treating at least a portion of a subterranean formation, comprising:
    providing a slurry comprising a fracturing fluid and proppant particulates;
    introducing the slurry into a portion of a fracture within the subterranean formation; and,
    depositing the proppant particulates into the portion of the fracture within the subterranean formation so as to form a high porosity propped fracture without the addition of an acidic afterflush.

16. The method of claim 15 wherein the proppant particulates comprise a high density plastic.

17. The method of claim 16 wherein the high density plastic is selected from the group consisting of: polyamide 6 (Nylon 6), polyamide 66 (Nylon 6/6), acrylic, acrylonitrile butadiene styrene (ABS), ethylene vinyl alcohol, polycarbonate/PET polyester blend, polyethylene terephthalate (PET), unreinforced polycarbonate/polybutylene terephthalate (PC/PBT) blend, PETG copolyester, polyetherimide, polyphenylene ether, molded polyphenylene sulfide (PPS), heat resistant grade polystyrene, polyvinylbenzene, polyphenylene oxide, a blend of polyphenylene oxide and nylon 6/6, acrylonitrile-butadiene-styrene, polyvinylchloride, fluoroplastics, polysulfide, polypropylene, styrene acrylonitrile, polystyrene, phenylene oxide, polyolefins, polystyrene divinylbenzene, polyfluorocarbons, polyethers etherketones, polyamide imides, and combinations thereof.

18. The method of claim 16 wherein the high density plastic is selected from the group consisting of: acrylic-based resins, epoxy-based resins, furan-based resins, phenolic-based resins, phenol/phenol formaldehyde/furfuryl alcohol resins, polyester resins, and combinations thereof.

19. The method of claim 15 wherein the proppant particulates further comprise a reinforcing material.

20. The method of 18 wherein the reinforcing material is selected from the group consisting of: bauxite, nut hulls, ceramic, metal, glass, sand, asbestos, mica, silica, alumina, glass fibers, cotton fibers, and combinations thereof.

* * * * *